United States Patent
Malladi et al.

(10) Patent No.: US 9,300,446 B2
(45) Date of Patent: Mar. 29, 2016

(54) METHOD AND APPARATUS FOR RANDOM ACCESS IN AN ORTHOGONAL MULTIPLE-ACCESS COMMUNICATION SYSTEM

(71) Applicant: QUALCOMM Incorporated, San Diego, CA (US)

(72) Inventors: Durga Prasad Malladi, San Diego, CA (US); Aleksandar Damnjanovic, Del Mar, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/622,990

(22) Filed: Sep. 19, 2012

(65) Prior Publication Data

US 2013/0016701 A1    Jan. 17, 2013

Related U.S. Application Data

(63) Continuation of application No. 11/841,609, filed on Aug. 20, 2007, now Pat. No. 8,295,243.

(60) Provisional application No. 60/839,220, filed on Aug. 21, 2006, provisional application No. 60/828,058, filed on Oct. 3, 2006, provisional application No. 60/863,610, filed on Oct. 31, 2006.

(51) Int. Cl.
*H04W 4/00*    (2009.01)
*H04L 5/00*    (2006.01)
(Continued)

(52) U.S. Cl.
CPC ............. *H04L 5/003* (2013.01); *H04L 1/0029* (2013.01); *H04L 1/0032* (2013.01);
(Continued)

(58) Field of Classification Search
CPC ..... H04L 5/003; H04L 1/0029; H04L 1/0032; H04L 1/0061; H04L 5/0053; H04L 5/0091; H04L 5/0037; H04L 5/006; H04L 25/03866; H04W 74/002; H04W 74/0833

USPC ......... 370/232, 328, 260, 329, 338, 351, 355, 370/412–418; 455/434, 436, 438, 450, 453, 455/517, 522, 552, 561, 562.1
See application file for complete search history.

(56) References Cited

U.S. PATENT DOCUMENTS 6,263,065 B1 *   7/2001   Durinovic-Johri .... H04M 3/323
                                                    379/265.02
6,597,675 B1     7/2003   Esmailzadeh et al.
(Continued)

FOREIGN PATENT DOCUMENTS

EP    1009184 A2    6/2000
JP    2009524324 A  6/2009
(Continued)

OTHER PUBLICATIONS

3GPP TR 25.814 V7.0.0 (Jun. 2006) 3rd Generation Partnership Project; Technical Spcification Group Radio Access Network "Physical layer apsect for evolved Universal Terrestrial Radio Access (UTRA)", 3GPP TR 25.814 v. 7.0.0, Release 7, Jun. 15, 2006.
(Continued)

*Primary Examiner* — Ajay Cattungal
(74) *Attorney, Agent, or Firm* — Ashish L. Patel

(57) ABSTRACT

Techniques for accessing a wireless communication system are described. A user equipment (UE) sends a random access preamble for system access. The random access preamble may include a random identifier (ID), a channel quality indicator (CQI), etc. The UE may randomly select the random ID or may be assigned this random ID. The UE receives a random access response from a base station. The random access response may include control channel resources (e.g., CQI and PC resources), uplink resources, and/or control information (e.g., timing advance and PC correction) for the UE. The random access response may be sent in two parts using two messages. A first message may be sent on a control channel and may include identification information and possibly other information. A second message may be sent on a shared data channel and may include remaining information for the random access response.

23 Claims, 16 Drawing Sheets

(51) Int. Cl.
  *H04L 1/00* (2006.01)
  *H04W 74/00* (2009.01)
  *H04W 74/08* (2009.01)
  *H04L 25/03* (2006.01)
  *H04W 56/00* (2009.01)

(52) U.S. Cl.
  CPC ........... *H04L 1/0061* (2013.01); *H04L 5/0053* (2013.01); *H04L 5/0091* (2013.01); *H04W 74/002* (2013.01); *H04W 74/0833* (2013.01); *H04L 5/006* (2013.01); *H04L 5/0007* (2013.01); *H04L 5/0037* (2013.01); *H04L 25/03866* (2013.01); *H04W 56/0045* (2013.01)

(56) References Cited

U.S. PATENT DOCUMENTS

| | | | |
|---|---|---|---|
| 6,959,081 B2 * | 10/2005 | Brown | H04M 3/5233 379/265.11 |
| 7,039,370 B2 | 5/2006 | Laroia et al. | |
| 7,065,366 B2 | 6/2006 | Cave | |
| 7,239,884 B2 | 7/2007 | Khawand et al. | |
| 7,301,929 B2 | 11/2007 | Frederiksen et al. | |
| 7,328,013 B2 | 2/2008 | Vialen et al. | |
| 7,433,334 B2 | 10/2008 | Marjelund et al. | |
| 7,496,066 B2 | 2/2009 | Speltacker et al. | |
| 7,583,644 B2 * | 9/2009 | Morioka | H04W 74/002 370/338 |
| 7,630,733 B2 | 12/2009 | Usuda et al. | |
| 7,636,570 B2 | 12/2009 | Cho et al. | |
| 7,653,409 B2 | 1/2010 | Inaba | |
| 7,664,076 B2 | 2/2010 | Kim et al. | |
| 8,169,944 B2 | 5/2012 | Walton et al. | |
| 8,295,243 B2 | 10/2012 | Malladi et al. | |
| 2002/0071480 A1 * | 6/2002 | Marjelund | H04W 8/22 375/141 |
| 2003/0176195 A1 | 9/2003 | Dick et al. | |
| 2004/0147274 A1 * | 7/2004 | Khawand | H04W 52/10 455/522 |
| 2004/0233870 A1 * | 11/2004 | Willenegger | H04W 52/223 370/329 |
| 2005/0075108 A1 * | 4/2005 | Cho | H04W 36/0055 455/436 |
| 2005/0085197 A1 * | 4/2005 | Laroia | H01Q 3/24 455/101 |
| 2005/0124353 A1 * | 6/2005 | Cave | H04W 28/16 455/453 |
| 2005/0125798 A1 * | 6/2005 | Peterson | G06F 9/5083 718/105 |
| 2006/0003784 A1 | 1/2006 | Chion et al. | |
| 2006/0126570 A1 * | 6/2006 | Kim | H04J 13/0025 370/335 |
| 2006/0140143 A1 * | 6/2006 | Bauer | H04W 8/12 370/328 |
| 2006/0209692 A1 * | 9/2006 | Usuda | H04L 47/10 370/232 |
| 2006/0217142 A1 * | 9/2006 | Inaba | H04W 52/143 455/522 |
| 2007/0201427 A1 * | 8/2007 | Lee | H04L 45/24 370/351 |
| 2007/0206531 A1 * | 9/2007 | Pajukoski | H04W 74/0866 370/329 |
| 2008/0188219 A1 * | 8/2008 | Fischer | H04W 74/0866 455/434 |
| 2009/0201891 A1 * | 8/2009 | Lee | H04L 1/1671 370/336 |
| 2014/0133443 A1 | 5/2014 | Malladi | |

FOREIGN PATENT DOCUMENTS

| | | |
|---|---|---|
| RU | 2168278 C2 | 5/2001 |
| RU | 2227372 | 4/2004 |
| RU | 2232469 C2 | 7/2004 |
| WO | 9901002 | 1/1999 |
| WO | 9960729 A1 | 11/1999 |
| WO | 0147289 A2 | 6/2001 |
| WO | 2005057822 | 6/2005 |
| WO | 2007083230 | 7/2007 |

OTHER PUBLICATIONS

Catt, "Access procedure for TDD", 3GPP TSG RAN WG2 ad-hoc on LTE R2-061898, Jun. 27, 2006, URL, http://www.3gpp.org/ftp/tsg_ran/WG2_RL2/TSGR2_AHs/2006_06_LTE/Docs/R2-061898.zip.

International Search Report—PCT/US07/076439, International Search Authority—European Patent Office—Dec. 11, 2008.

Motorola: "LTE Random Access Procedure", 3GPP TSG-RAN WG2#53, [On line] vol. R2-061463, May 8- 12, 2006, p. 1-4 XP007905045 Shanghai, China URL:http://www.3gpp.org/ftp/tsg_ran/WG2_RL2/TSGR2_53/Documents/>.

Motorola: "Random Access Procedure", 3GPP RAN1 LTE Adhoc, [Online] vol. R1-061708, May 8-12, 2006, p. 1-2 XP007905046, Cannes, France, Retrieved from the Internet Jun. 27, 2008: URL: http://www.3gpp.org/ftp/tsg_ran/WG1_AH/LTE_AH_June-06/Docs/>.

Nokia, Non-synchronized random access procedure, 3GPP TSG RAN WG1 LTE Ad Hoc R1-061901, Jun. 27, 2006, URL, http://www.3gpp.org/ftp/tsg_ran/wg1_rl1/TSGR1_AH/LTE_AH_June-06/Docs/R1-061901.zip.

NTT Docomo et al: "Random Access Transmission in E-Utra Uplink " 3GPP TSG-RAN WG1 LTE Adhoc Meeting, [Online] Jan 23-25, 2006 p. 1-8 XP007905047 Helsinki, Finland [Retrieved from the Internet] URL:http.

NTT DoCoMo, Fujitsu, NEC, Sharp, Toshiba Corporation,Non-synchronized Random Access Procedure for E-Utra Uplink, 3GPP TSG RAN WG1 LTE Ad Hoc R1-061660, Jun. 27, 2006, URL, http://www.3gpp.org/ftp/tsg_ran/wg1_rl1/TSGR1_AH/LTE_AH_June-06/Docs/R1-061660.zip.

Partial International Search Report—PCT/US07/076439, International Search Authority—European Patent Office—Jul. 9, 2008.

QUALCOMM Europe, Access Procedure, 3GPP TSG-RAN WG2 R2-062380, Sep. 1, 2006, URL, http://www.3gpp.org/ftp/tsg_ran/WG2_RL2/TSGR2_54/Documents/R2-062380.zip.

Taiwan Search Report—TW096130991—TIPO—Mar. 27, 2011.

Texas Instruments: "Random Access usage for RRC state transitions and mobility support", 3GPP Draft; R2-060852, 3RD Generation Partnership Project (3GPP), Mobile Competence Centre; 650 Route Des Lucioles; F-06921 Sophia-Antipolis Cedex; France, vol. tsg_ran/WG2_RL2"TSGR2-52/Documents/Joint_R1_R2. no. Athens, Greece; Mar. 20, 2006.

Written Opinion—PCT/US07/076439, International Search Authority—European Patent Office—Dec. 11, 2008.

Motorola: "E-UTRAN Non-Synchronized Random Access Procedure", 3GPP TSG-RAN WG1#46b R1-062602, Oct. 4, 2006, 6 Pages.

NTT DoCoMo, Inc., "Signalling optimized DL scheduling for LTE", 3GPP TSG-RAN WG2#56bis R2-070272, Jan. 12, 2007, pp. 1-4.

* cited by examiner

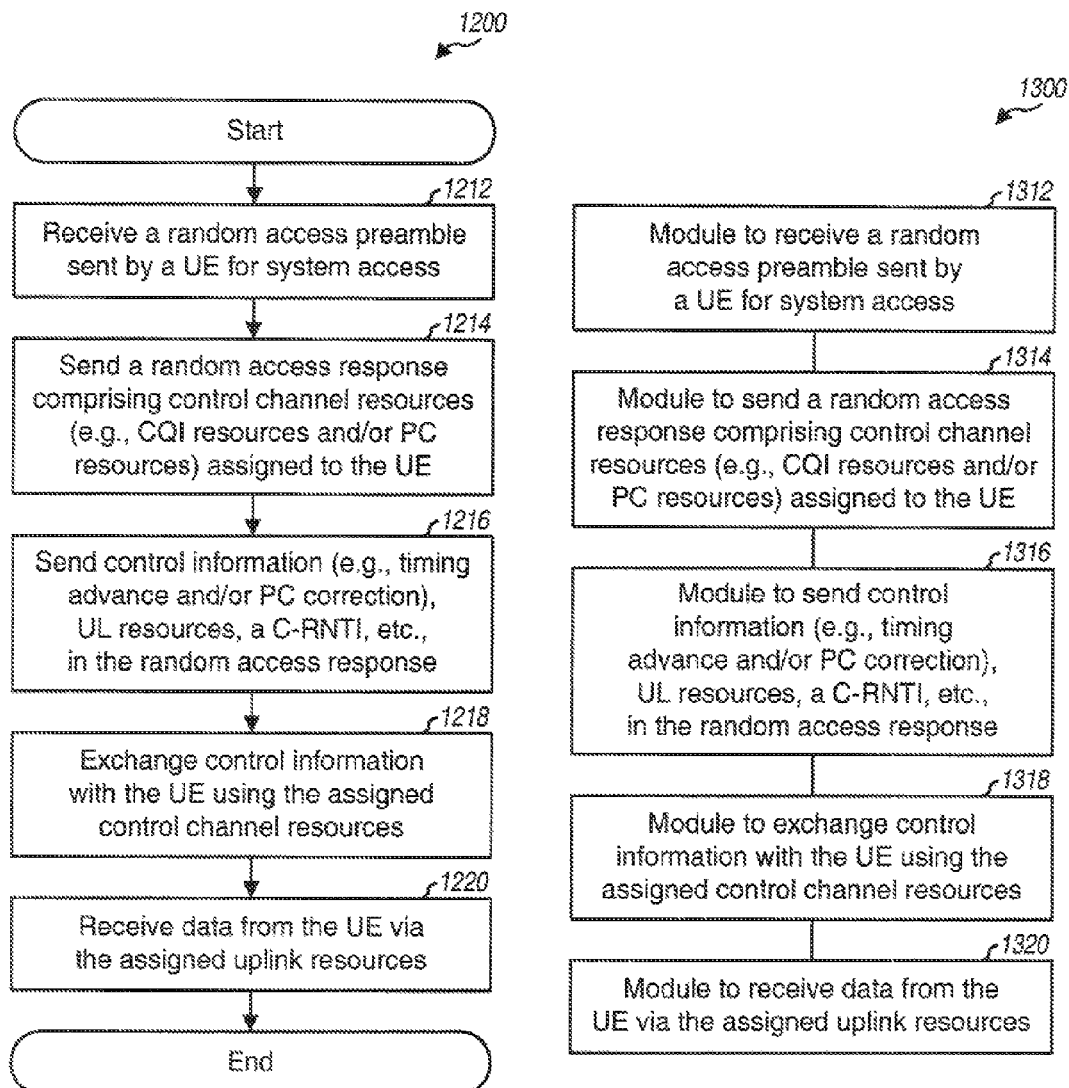

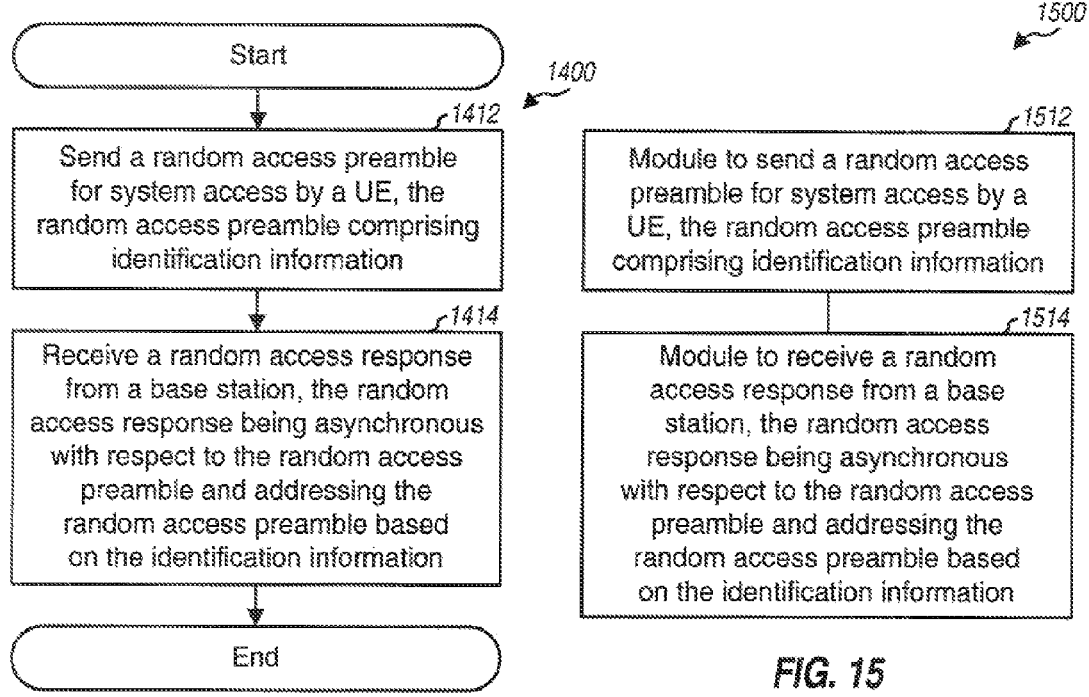
FIG. 14
FIG. 15
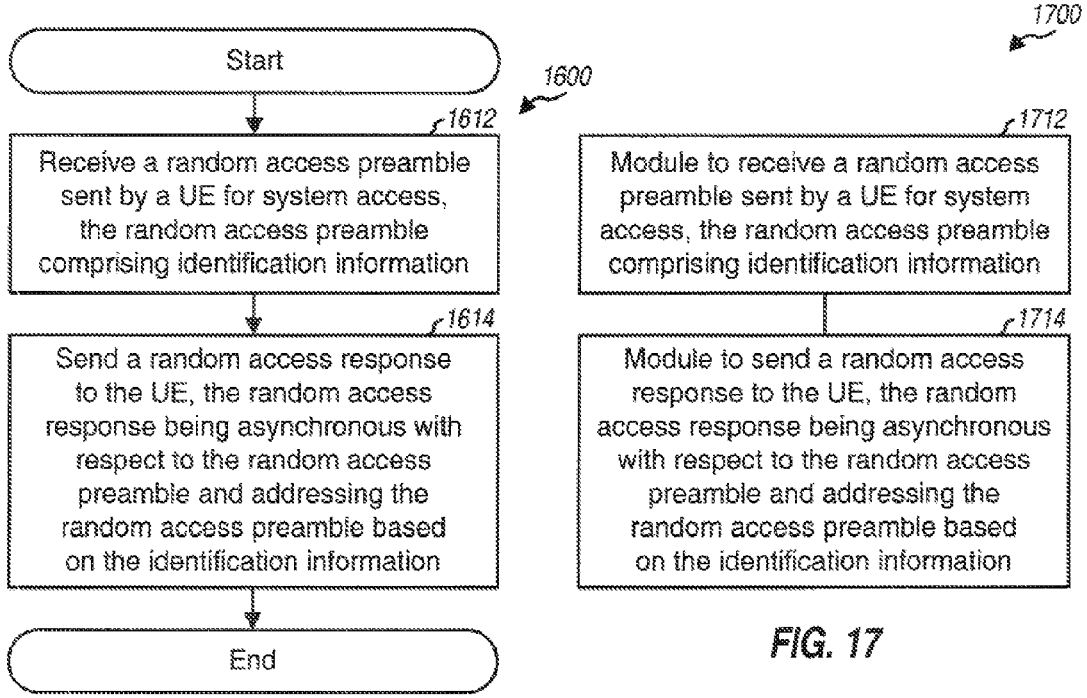
FIG. 16
FIG. 17

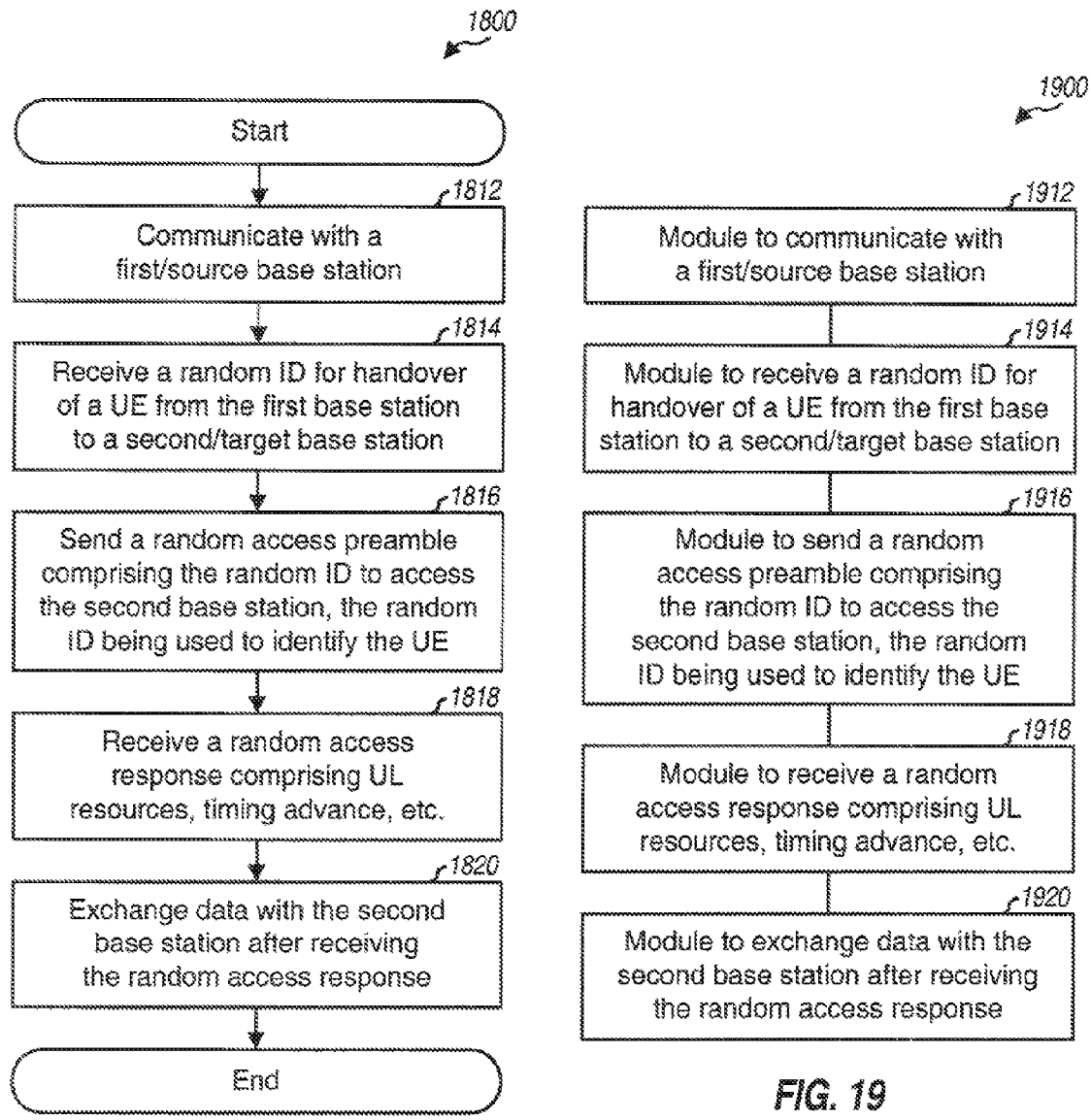

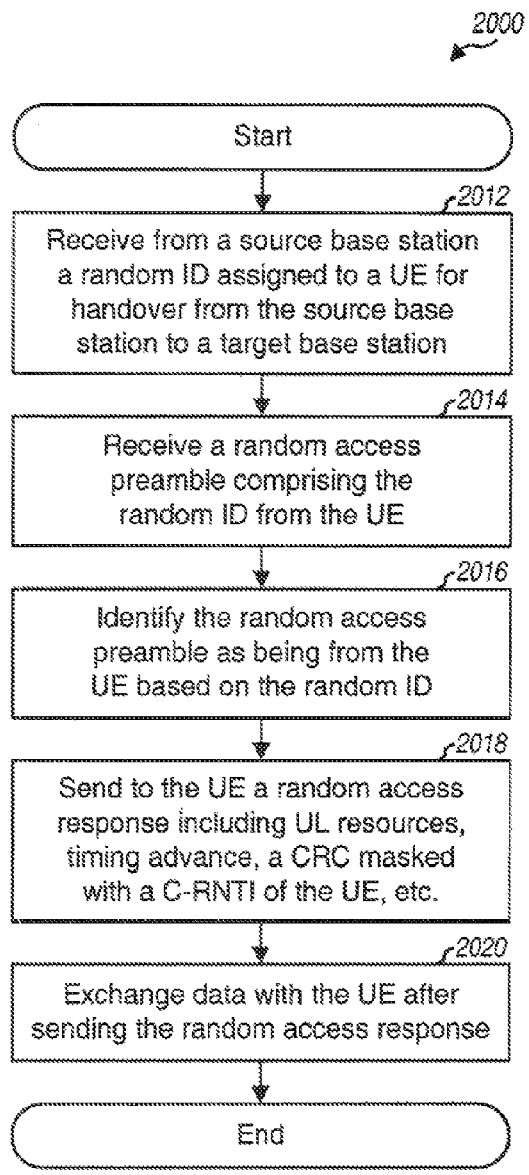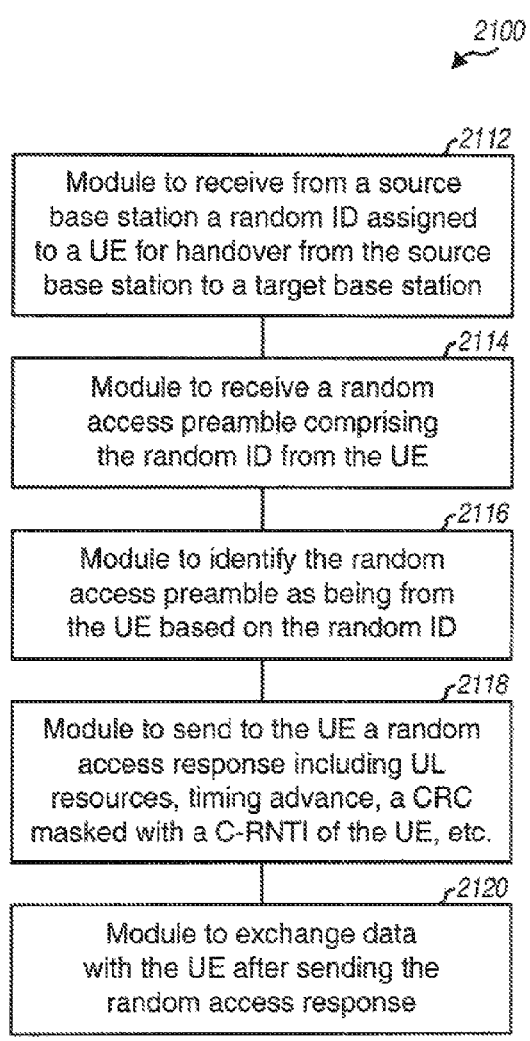
FIG. 20
FIG. 21

METHOD AND APPARATUS FOR RANDOM ACCESS IN AN ORTHOGONAL MULTIPLE-ACCESS COMMUNICATION SYSTEM

This application is a continuation of U.S. application Ser. No. 11/841,609, entitled "METHOD AND APPARATUS FOR RANDOM ACCESS IN AN ORTHOGONAL MULTIPLE-ACCESS COMMUNICATION SYSTEM," filed Aug. 20, 2007, which claims priority to provisional U.S. Application Ser. No. 60/839,220, entitled "A METHOD AND APPARATUS FOR ACCESS PROCEDURE FOR ORTHOGONAL MULTIPLE ACCESS SYSTEMS," filed Aug. 21, 2006, U.S. Application Ser. No. 60/828,058, entitled "A METHOD AND APPARATUS FOR ACCESS PROCEDURE," filed Oct. 3, 2006, and U.S. Application Ser. No. 60/863,610, entitled "A METHOD AND APPARATUS FOR ACCESS PROCEDURE FOR ORTHOGONAL MULTIPLE ACCESS SYSTEMS," filed Oct. 31, 2006, all assigned to the assignee hereof and incorporated herein by reference.

BACKGROUND

I. Field

The present disclosure relates generally to communication, and more specifically to techniques for accessing a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (TDMA) systems, Orthogonal FDMA (OFDMA) systems, and Single-Carrier FDMA (SC-FDMA) systems.

A wireless communication system may include any number of base stations that can support communication for any number of user equipments (UEs). Each UE may communicate with one or more base stations via transmissions on the downlink and uplink. The downlink (or forward link) refers to the communication link from the base stations to the UEs, and the uplink (or reverse link) refers to the communication link from the UEs to the base stations.

A UE may send an access probe on the uplink when the UE desires to gain access to the system. A base station may receive the access probe and respond with an access grant that may contain pertinent information for the UE. Uplink resources are consumed to send access probes, and downlink resources are consumed to send access grants. There is therefore a need in the art for techniques to support system access with as little overhead as possible in order to improve system capacity.

SUMMARY

Techniques for efficiently accessing a wireless communication system are described herein. In one design, a UE may send a random access preamble (or access probe) for system access. The random access preamble may include a random identifier (ID), a downlink channel quality indicator (CQI), etc. The UE may randomly select the random ID or may be assigned the random ID directly or indirectly (in an assigned random access preamble/access sequence), e.g., during handover. The random ID may be used as identification information for the random access preamble and may allow a base station to asynchronously respond to the random access preamble.

The UE may receive a random access response (or access grant) from the base station. The random access response may include control channel resources, uplink resources, control information, an assigned ID, etc., for the UE. The control channel resources may include CQI resources used to send CQI on the uplink by the UE, power control (PC) resources used to send PC corrections on the downlink to the UE, etc. The control information may include timing advance used to adjust transmit timing of the UE, PC correction used to adjust transmit power of the UE, etc. The random access response may be sent in two parts using two messages. A first message may be sent on a control channel (e.g., a PDCCH) for a shared data channel (e.g., a PDSCH). A second message may be sent on the shared data channel. The first message may include the identification information for the random access preamble or a random access channel used to send the random access preamble, downlink resources for the shared data channel, and possibly other information. The second message may include remaining information for the random access response. The UE may exchange control information using the assigned control channel resources and may send data using the assigned uplink resources.

Various aspects and features of the disclosure are described in further detail below.

BRIEF DESCRIPTION OF THE DRAWINGS

FIGS. 10 through 25 show various processes and apparatuses for the UE and the base station for system access by the UE.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for system access in LTE, and LTE terminology is used in much of the description below.

Figure 1:
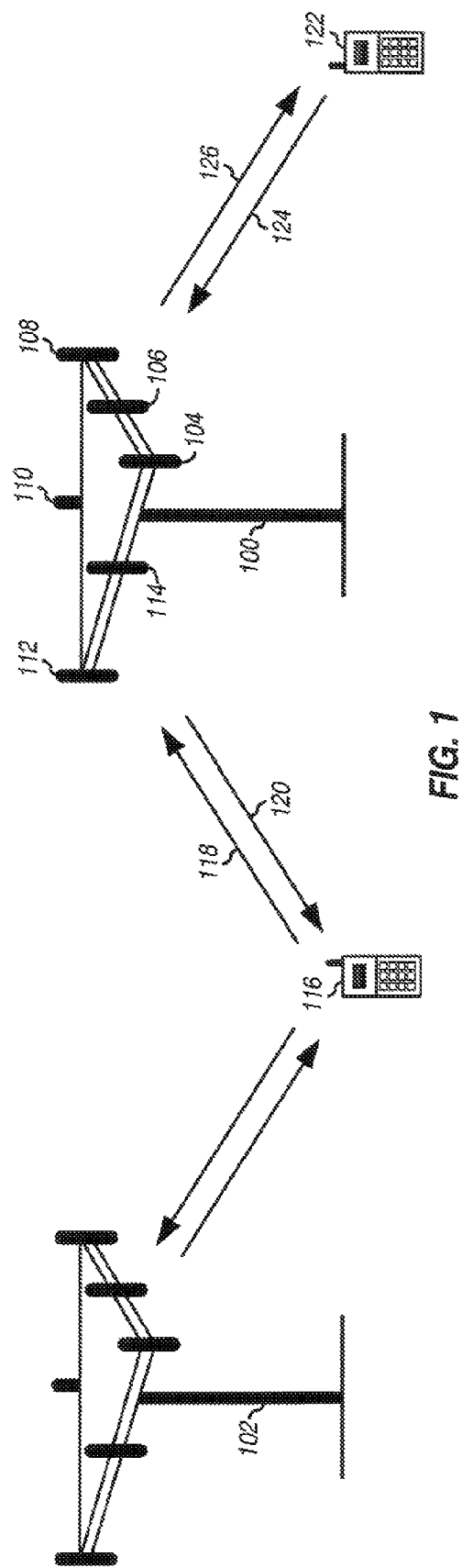
FIG. 1 shows a wireless multiple-access communication system.

FIG. 1 shows a wireless multiple-access communication system according to one design. For simplicity, FIG. 1 shows only two evolved Node B (eNB) 100 and 102. eNB 100 includes multiple antenna groups, one group including antennas 104 and 106, another group including antennas 108 and 110, and an additional group including antennas 112 and 114. In FIG. 1, only two antennas are shown for each antenna group. However, more or fewer antennas may also be utilized for each antenna group. In general, an eNB may be a fixed station used for communicating with the UEs and may also be referred to as a Node B, a base station, an access point, etc.

A UE 116 is in communication with antennas 112 and 114, where antennas 112 and 114 transmit information to UE 116 via downlink 120 and receive information from UE 116 via uplink 118. A UE 122 is in communication with antennas 106 and 108, where antennas 106 and 108 transmit information to UE 122 via downlink 126 and receive information from UE 122 via uplink 124. In general, a UE may be stationary or mobile and may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, etc. In a frequency division duplex (FDD) system, communication links 118, 120, 124 and 126 may use different frequencies for communication. For example, downlink 120 and 126 may use one frequency, and uplink 118 and 124 may use another frequency.

The overall coverage area of eNB 100 may be partitioned into multiple (e.g., three) smaller areas. These smaller areas may be served by different groups of antennas of eNB 100. In 3GPP, the term "cell" can refer to the smallest coverage area of an eNB and/or an eNB subsystem serving this coverage area. In other systems, the term "sector" can refer to the smallest coverage area and/or the subsystem serving this coverage area. For clarity, 3GPP concept of cell is used in the description below. In one design, the three antenna groups of eNB 100 support communication for UEs in three cells of eNB 100.

Figure 2:
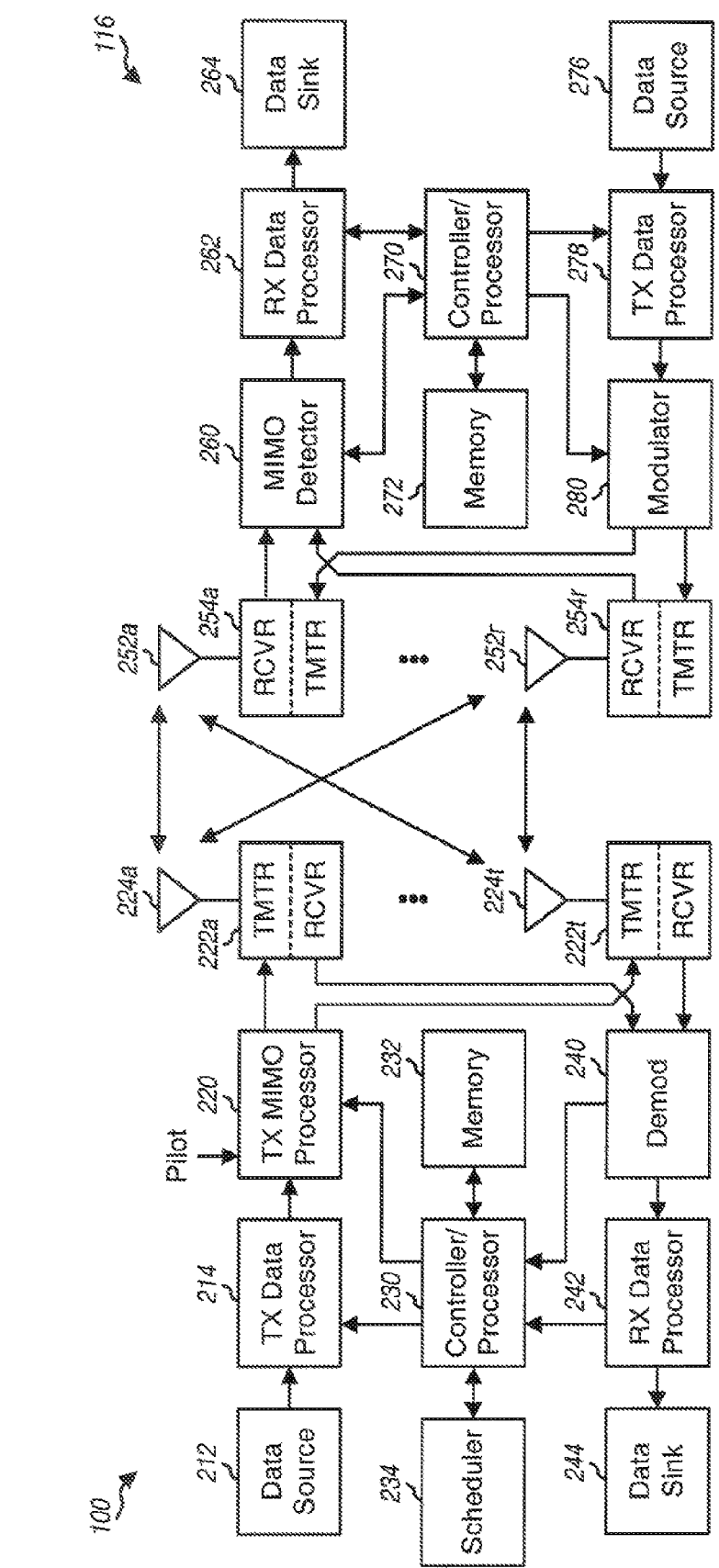
FIG. 2 shows a block diagram of a base station and a UE.

FIG. 2 shows a block diagram of a design of eNB 100 and UE 116. In this design, eNB 100 is equipped with T antennas 224a through 224t, and UE 116 is equipped with R antennas 252a through 252r, where in general T≥1 and R≥1.

At eNB 100, a transmit (TX) data processor 214 may receive traffic data for one or more UEs from a data source 212. TX data processor 214 may process (e.g., format, encode, and interleave) the traffic data for each UE based on one or more coding schemes selected for that UE to obtain coded data. TX data processor 214 may then modulate (or symbol map) the coded data for each UE based on one or more modulation schemes (e.g., BPSK, QSPK, M-PSK or M-QAM) selected for that UE to obtain modulation symbols.

A TX MIMO processor 220 may multiplex the modulation symbols for all UEs with pilot symbols using any multiplexing scheme. Pilot is typically known data that is processed in a known manner and may be used by a receiver for channel estimation and other purposes. TX MIMO processor 220 may process (e.g., precode) the multiplexed modulation symbols and pilot symbols and provide T output symbol streams to T transmitters (TMTR) 222a through 222t. In certain designs, TX MIMO processor 220 may apply beamforming weights to the modulation symbols to spatially steer these symbols. Each transmitter 222 may process a respective output symbol stream, e.g., for orthogonal frequency division multiplexing (OFDM), to obtain an output chip stream. Each transmitter 222 may further process (e.g., convert to analog, amplify, filter, and upconvert) the output chip stream to obtain a downlink signal. T downlink signals from transmitters 222a through 222t may be transmitted via T antennas 224a through 224t, respectively.

At UE 116, antennas 252a through 252r may receive the downlink signals from eNB 100 and provide received signals to receivers (RCVR) 254a through 254r, respectively. Each receiver 254 may condition (e.g., filter, amplify, downconvert, and digitize) a respective received signal to obtain samples and may further process the samples (e.g., for OFDM) to obtain received symbols. A MIMO detector 260 may receive and process the received symbols from all R receivers 254a through 254r based on a MIMO receiver processing technique to obtain detected symbols, which are estimates of the modulation symbols transmitted by eNB 100. A receive (RX) data processor 262 may then process (e.g., demodulate, deinterleave, and decode) the detected symbols and provide decoded data for UE 116 to a data sink 264. In general, the processing by MIMO detector 260 and RX data processor 262 is complementary to the processing by TX MIMO processor 220 and TX data processor 214 at eNB 100.

On the uplink, at UE 116, traffic data from a data source 276 and signaling messages may be processed by a TX data processor 278, further processed by a modulator 280, conditioned by transmitters 254a through 254r, and transmitted to eNB 100. At eNB 100, the uplink signals from UE 116 may be received by antennas 224, conditioned by receivers 222, demodulated by a demodulator 240, and processed by an RX data processor 242 to obtain the traffic data and messages transmitted by UE 116.

Controllers/processors 230 and 270 may direct the operation at eNB 100 and UE 116, respectively. Memories 232 and 272 may store data and program codes for eNB 100 and UE 116, respectively. A scheduler 234 may schedule UEs for downlink and/or uplink transmission and may provide assignments of resources for the scheduled UEs.

The system may support one set of transport channels for the downlink and another set of transport channels for the uplink. These transport channels may be used to provide information transfer services to Medium Access Control (MAC) and higher layers. The transport channels may be described by how and with what characteristics information is sent over a radio link. The transport channels may be mapped to physical channels, which may be defined by various attributes such as modulation and coding, mapping of data to resource blocks, etc. Table 1 lists some physical channels used for the downlink (DL) and uplink (UL) in LTE in accordance with one design.

TABLE 1

| Link | Channel | Channel Name | Description |
| --- | --- | --- | --- |
| DL | PBCH | Physical Broadcast Channel | Carry control information broadcast over a cell. |
| DL | PDCCH | Physical Downlink Control Channel | Carry UE-specific control information for the PDSCH. |
| DL | PDSCH | Physical Downlink Shared Channel | Carry data for UEs in a shared manner. |
| UL | PRACH | Physical Random Access Channel | Carry random access preambles from UEs attempting to access the system. |
| UL | PUCCH | Physical Uplink Control Channel | Carry control information from UEs such as CQI, ACK/NAK, resource requests, etc. |
| UL | PUSCH | Physical Uplink Shared Channel | Carry data sent by a UE on uplink resources assigned to the UE. |

Other physical channels may also be used for paging, multicast, etc. The physical channels may also be referred to by other names. For example, the PDCCH may also be referred to as a Shared Downlink Control Channel (SDCCH), Layer 1/Layer 2 (L1/L2) control, etc. The PDSCH may also be referred to as a downlink PDSCH (DL-PDSCH). The PUSCH may also be referred to as an uplink PDSCH (UL-PDSCH).

The transport channels may include a Downlink Shared Channel (DL-SCH) used to send data to UEs, an Uplink Shared Channel (UL-SCH) used to send data by UEs, a Random Access Channel (RACH) used to access the system, etc. The DL-SCH may be mapped to the PDSCH and may also be referred to as a Downlink Shared Data Channel (DL-SDCH). The UL-SCH may be mapped to the PUSCH and may also be referred to as an Uplink Shared Data Channel (UL-SDCH). The RACH may be mapped to the PRACH.

A UE may transmit a random access preamble on the uplink whenever the UE desires to access the system, e.g., if the UE has data to send or if the UE is paged by the system. A random access preamble may also be referred to as an access signature, an access probe, a random access probe, a signature sequence, a RACH signature sequence, etc. The random access preamble may include various types of information and may be sent in various manners, as described below. An eNB may receive the random access preamble and may respond by sending a random access response to the UE. A random access response may also be referred to as an access grant (AGCH), an access response, etc. The random access response may carry various types of information and may be sent in various manners, as described below. The UE and Node B may further exchange signaling to set up a radio connection and may thereafter exchange data.

It may be beneficial to provide assigned resources and control information in the random access response in order to expedite communication between the UE and eNB. However, a large number of bits may be used to convey the resource assignment and control information. In an aspect, the random access response may be partitioned into multiple parts that may be efficiently sent on the PDCCH and PDSCH, as described below. In another aspect, the eNB may asynchronously respond to the random access preamble and may identify this random access preamble using various mechanisms, as also described below.

Figure 3:
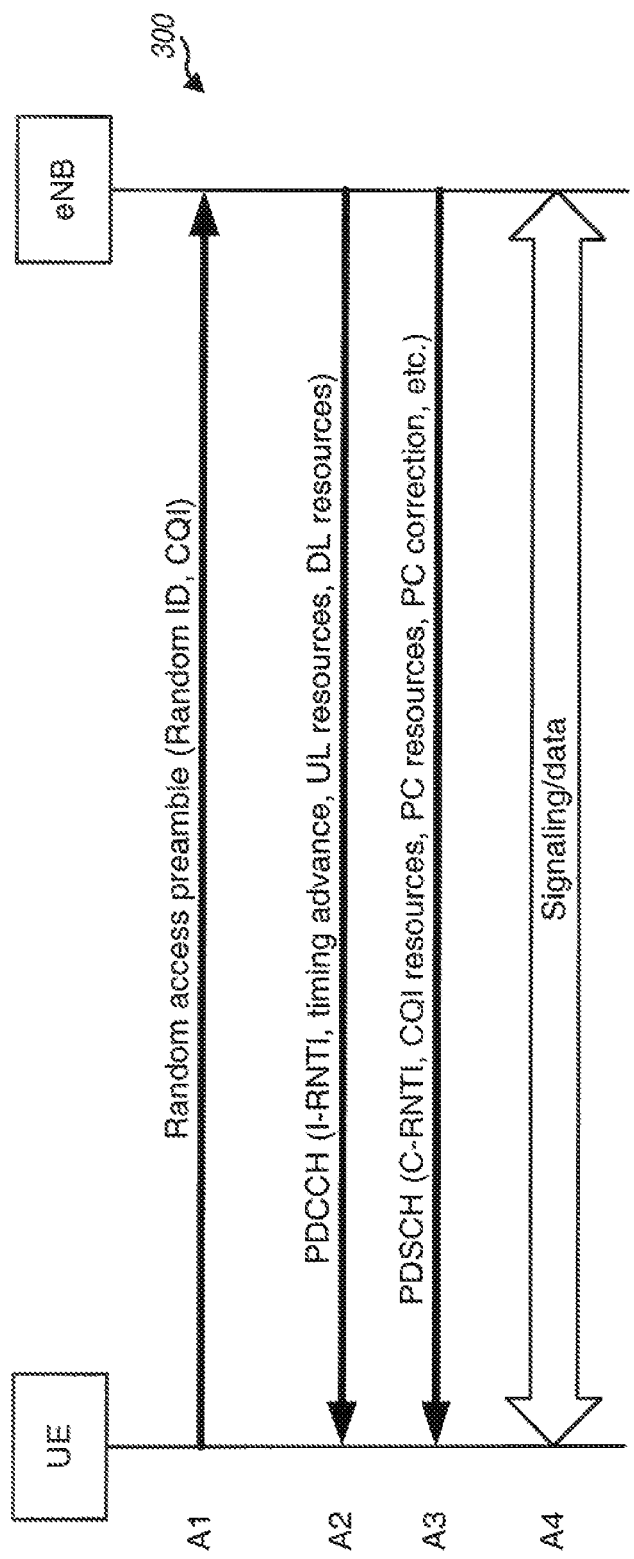
FIGS. 3 through 9 show message flows for various random access procedures.

FIG. 3 shows a message flow for a design of a random access procedure 300. In this design, the UE may access the system by sending a random access preamble, e.g., in response to data arriving at a UE transmit buffer (step A1). The random access preamble may include L bits, where L may be any integer value. An access sequence may be selected from a pool of $2^L$ available access sequences and sent for the random access preamble. In one design, the random access preamble may include L=6 bits, and one access sequence may be selected from a pool of 64 access sequences. The access sequences may be of any length and may be designed to have good detection properties.

In one design, the random access preamble may include (i) a random ID that may be pseudo-randomly selected by the UE and (ii) a downlink CQI indicative of the downlink channel quality as measured by the UE. The random ID may be used to identify the random access preamble from the UE. The downlink CQI may be used to send subsequent downlink transmission to the UE and/or to assign uplink resources to the UE. In one design, a 6-bit random access preamble may include a 4-bit random ID and a 2-bit CQI. In another design, a 6-bit random access preamble may include a 5-bit random ID and a 1-bit CQI. The random access preamble may also include different and/or additional information, and each type of information may include any number of bits.

The UE may determine an Implicit Radio Network Temporary Identifier (I-RNTI) that may be used as a temporary ID for the UE during system access. The UE may be identified by the I-RNTI until a more permanent ID such as a Cell RNTI (C-RNTI) is assigned to the UE. In one design, the I-RNTI may include the following:

System time (8 bits)—time when the access sequence is sent by the UE, and

RA-preamble identifier (6 bits)—index of the access sequence sent by the UE.

The RA-preamble identifier may be an L-bit value for the random access preamble being sent by the UE. The RA-preamble identifier may also be referred to as a random access preamble identifier, an access signature index, etc.

The I-RNTI may have a fixed length (e.g., 16 bits) and may be padded with a sufficient number of zeros (e.g., 2 zeros) to achieve the fixed length. The UE may send the access sequence in an access slot that is present in each frame. The system time may then be given in units of frames. An 8-bit system time may be unambiguous over 256 frames. If a frame has a duration of 10 milliseconds (ms), then the I-RNTI may be valid for 2560 ms with the 8-bit system time. In another design, the I-RNTI is composed of 4-bit system time, 6-bit RA-preamble identifier, and padding bits (if needed). In this design, the I-RNTI may be valid for 160 ms. In yet another design, a frequency slot may be used for either the RA-preamble identifier or the system time. In general, the I-RNTI may be formed with any information that may (i) allow the UE or random access preamble to be individually addressed and (ii) reduce the likelihood of collision with another UE using the same I-RNTI. The lifetime of the I-RNTI may be selected based on the maximum expected response time for an asynchronous response to the random access preamble.

An eNB may receive the random access preamble from the UE and may respond by sending a random access response to the UE. The eNB may determine the I-RNTI of the UE in the same manner as the UE. Since the I-RNTI is valid for a particular time window or lifetime (e.g., 2560 ms with the 8-bit system time), the eNB may respond any time within this time window. However, the eNB may typically respond in a much shorter interval (e.g., in 40 to 80 ms) in order to save on complexity and improve system access response time. The I-RNTI may thus allow the eNB to address the UE and to asynchronously respond to the random access preamble from the UE.

The eNB may send the random access response on the PDCCH and PDSCH to the UE (steps A2 and A3). In one design, the PDCCH may carry a message containing the following:

I-RNTI—identify the UE as the recipient of the access grant sent by the eNB,

Timing advance—indicate adjustment to the transmit timing of the UE,

UL resources—indicate resources granted to the UE for uplink transmission, and

DL resources—indicate PDSCH resources used to send remaining information in the random access response to the UE.

The timing advance may also be referred to as timing alignment information, timing adjustment, timing correction, etc. The eNB may determine the timing of the random access preamble, as received at the eNB. The eNB may generate the timing advance such that subsequent uplink transmissions from the UE are properly time-aligned at the eNB.

The UL and DL resources may be conveyed in various manners. In one design, the available resources for a given link may be partitioned into resource blocks, and the granted resources may be conveyed by a resource block index. In another design, the grant resources may be conveyed by the size and time-frequency location of the granted resources. The access grant may also convey the modulation and coding to use for the granted resources. Alternatively, the modulation and coding may be fixed/predefined or may be advertised on a broadcast channel. In general, the PDCCH may convey any information used by the UE to transmit on the UL resources and any information used by the UE to receive the transmission sent on the PDSCH to the UE.

The I-RNTI may be sent explicitly in a designated field. Alternatively, the I-RNTI may be sent implicitly and embedded with other information, which may reduce the amount of information to send on the PDCCH. For example, a cyclic redundancy check (CRC) may be generated based on all information being sent on the PDCCH (except for the I-RNTI). The CRC may be exclusive ORed (XORed) with the I-RNTI, and the XORed CRC may be sent on the PDCCH. The recipient UE would be able to recover the CRC by applying the correct I-RNTI, while other UEs would generate erroneous CRCs by applying wrong I-RNTIs.

In one design, the PDSCH may carry a message containing the following:
  C-RNTI—included by the eNB if one is being assigned to the UE,
  CQI resources—indicate UL resources granted to the UE to send CQI,
  PC resources—indicate DL resources used to send PC corrections to the UE, and
  PC correction—indicate adjustment to the transmit power of the UE.

The C-RNTI may be used to identify the UE for a communication session. A MAC ID or some other type of ID may also be used instead of the C-RNTI to identify the UE. The C-RNTI may be sent on the PDSCH as part of the random access response, if it is available, or may be sent at any time within the lifetime of the I-RNTI. The I-RNTI may be used to identify the UE until the C-RNTI is assigned. The CQI and PC resources may be conveyed in various manners. In one design, the CQI or PC resources may be conveyed by a resource block index, the size and time-frequency location of the granted resources, the frequency of the granted resources, etc. In one design, the PC correction may be either (i) an up command to increase the UE's transmit power by a predetermined up step size or (ii) a down command to decrease the UE's transmit power by a predetermined down step size. In another design, the PC correction may indicate the amount of increase or decrease in transmit power.

The messages sent on the PDCCH and PDSCH may also carry different and/or other information. The eNB may transmit the PDCCH in a broadcast manner so that it can be reliably received by all UEs within the coverage of the eNB, e.g., by using sufficiently low code rate and modulation order and sufficiently high transmit power. The eNB may transmit the message for the UE on the PDSCH in a broadcast manner. Alternatively, the eNB may transmit this message using a modulation and coding scheme (MCS) selected based on the CQI received from the UE in the random access preamble. This may result in more efficient use of the available resources for the PDSCH.

The UE may receive and decode the messages sent on the PDCCH and PDSCH to the UE. After decoding these two messages, the UE has sufficient resources configured and can exchange Layer 3 signaling and/or data with the eNB (step A4). The UE may send an acknowledgement (ACK) to the eNB using on-off keying (OOK) to indicate successful reception of the messages. For OOK, an ACK may be sent as 1 (or "on"), and a negative acknowledgement (NAK) may be sent as 0 (or "off"). If the eNB asynchronously responds to the random access preamble from the UE, then the use of OOK would result in the UE transmitting on the uplink only for the ACK and not for the NAK. After achieving synchronization, the UE may transmit ACKs/NAKs using other modulation techniques, e.g., 3-state modulation.

Multiple UEs may randomly select the same random ID and may also send random access preambles in the same frame. When such a collision occurs, a mechanism may be implemented in the signaling exchange in step A4 to resolve the access contention.

The UE may operate in one of several states such as LTE Detached, LTE Idle and LTE Active states, which may be associated with RRC_NULL, RRC_IDLE and RRC_CONNECTED states, respectively. Radio Resource Control (RRC) may perform various functions for establishment, maintenance and termination of calls. In the LTE Detached state, the UE has not accessed the system and is not known by the system. The UE may power up in the LTE Detached state and may operate in the RRC_NULL state. The UE may transition to either the LTE Idle state or LTE Active state upon accessing the system and performing registration. In the LTE Idle state, the UE may have performed registration but may not have any data to exchange on the downlink or uplink. The UE may thus be idle and operate in the RRC_IDLE state. In the LTE Idle state, the UE and system may have pertinent context information to allow the UE to quickly transition to the LTE Active state. The UE may transition to the LTE Active state when there is data to send or receive. In the LTE Active state, the UE may actively communicate with the system on the downlink and/or uplink and may operate in the RRC_CONNECTED state.

Figure 4:
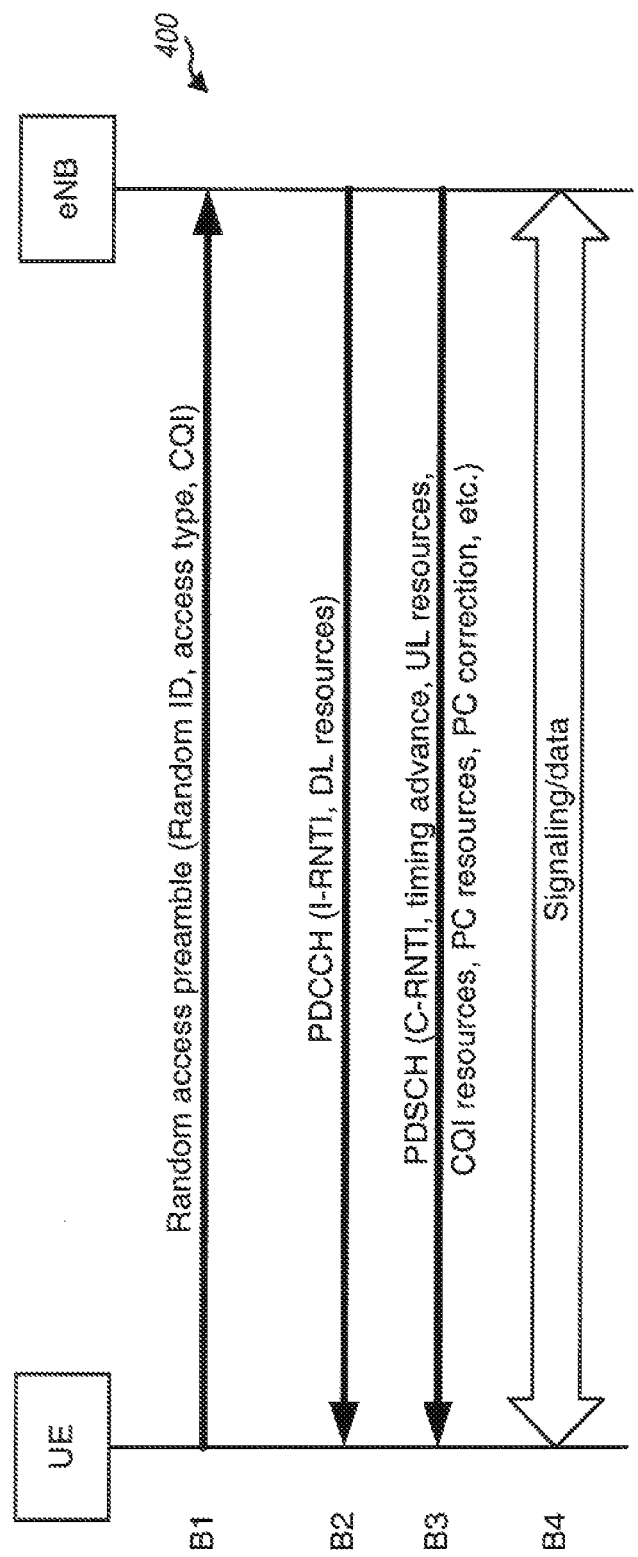

FIG. 4 shows a message flow for a design of a random access procedure 400. The UE may access the system by sending a random access preamble that may include a random ID, a downlink CQI, and an access type (step B1). The access type may indicate whether the UE is accessing the system from the RRC_NULL, RRC_IDLE or RRC_CONNECTED state. The UE may go through an authentication procedure when accessing the system from the RRC_NULL or RRC_IDLE state and may thus need different resource assignment than for system access from the RRC_CONNECTED state. The UE may communicate with an eNB in the RRC_CONNECTED state and may access another eNB for handover. The random access preamble may also include different and/or additional information. The UE may determine an I-RNTI as described above for FIG. 3.

An eNB may receive the random access preamble from the UE and may respond by sending a random access response on the PDCCH and PDSCH to the UE (steps B2 and B3). The eNB may determine the I-RNTI of the UE based on the random access preamble. In one design, the PDCCH may carry a message containing the I-RNTI and the DL resources for the PDSCH, which is used to send remaining information to the UE. In one design, the PDSCH may carry a message containing a C-RNTI (if available), timing advance, UL resources, CQI resources, PC resources, PC correction, etc. The messages sent on the PDCCH and PDSCH may also carry different and/or other information.

The eNB may transmit the PDCCH and PDSCH as described above for FIG. 3. The UE may receive and decode the messages sent on the PDCCH and PDSCH to the UE. After decoding these two messages, the UE has sufficient resources configured and can exchange Layer 3 signaling and/or data with the eNB (step B4).

Figure 5:
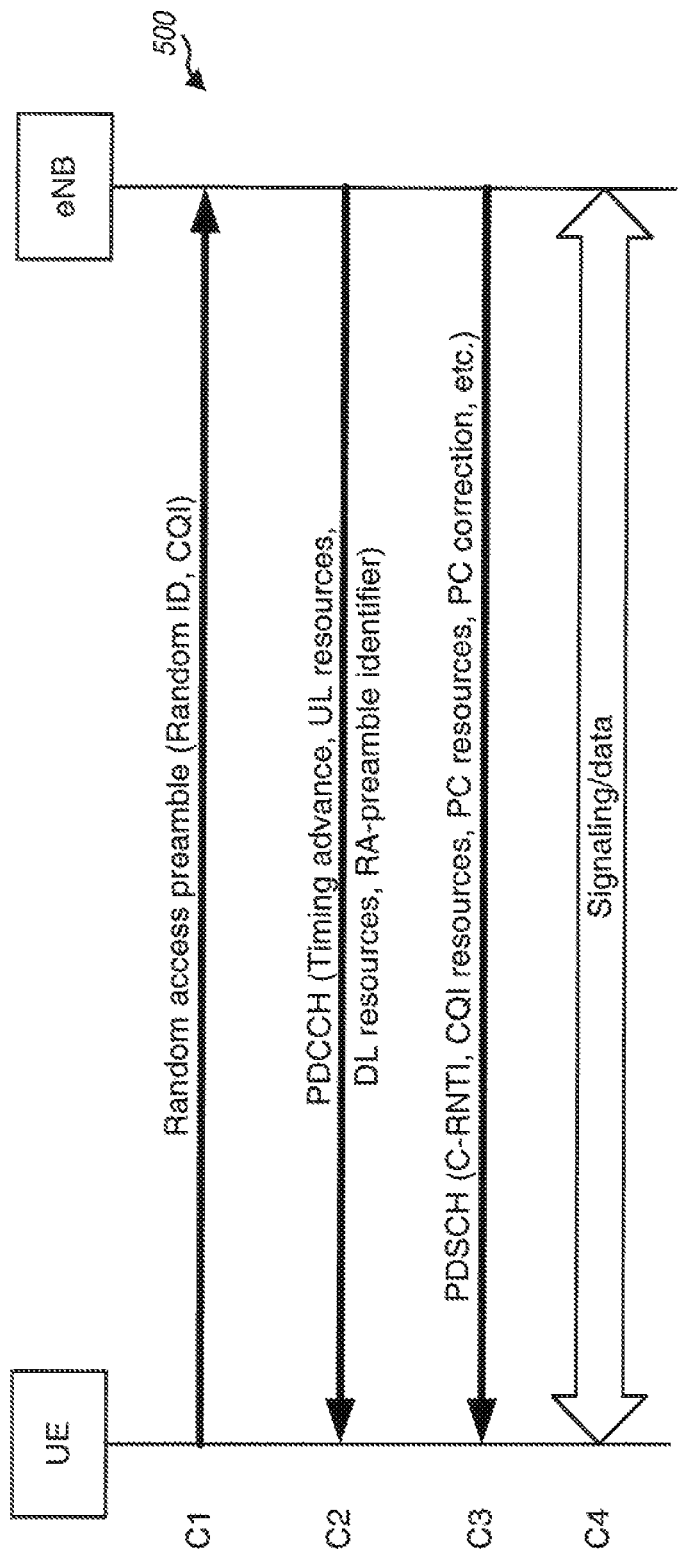

FIG. 5 shows a message flow for a design of a random access procedure 500. The UE may access the system by sending a random access preamble that may include a random ID and a downlink CQI (step C1). The random access preamble may also include different and/or additional information.

An eNB may receive the random access preamble from the UE and may respond by sending a random access response on the PDCCH and PDSCH to the UE (steps C2 and C3). In one design, the PDCCH may carry a message containing an RA-preamble identifier for the received random access preamble, timing advance, UL resources, DL resources, and a validity field. The validity field may support asynchronous access response and may indicate the frame for which the random access response is applicable. In one design, the validity field may include two bits and may be set to 00 to indicate that the current response is for the random access preamble sent in the current frame, to 01 to indicate that the current response is for the random access preamble sent in the previous frame, etc. To save bits, the RA-preamble identifier may mask a CRC generated based on all information sent on the PDCCH. In one design, the PDSCH may carry a message containing a C-RNTI (if available), CQI resources, PC resources, PC correction, etc. The messages sent on the PDCCH and PDSCH may also carry different and/or other information.

The eNB may transmit the PDCCH and PDSCH as described above for FIG. 3. The UE may receive and decode the messages sent on the PDCCH and PDSCH to the UE. After decoding these two messages, the UE has sufficient resources configured and can exchange Layer 3 signaling and/or data with the eNB (step C4).

In general, the random access preamble and the random access response may include any parameters, which may have any sizes. In one design, the random access preamble and the random access response may include the parameters given below:

Random access preamble may include the following:
  Random ID—4 bits
  Downlink CQI—2 bits
Random access response may include the following:
  C-RNTI—16 bits
  Timing advance—8 bits
  CQI resources & PC resources—16 bits
  UL resources—7 bits for resource block ID and 5 bits for MCS
  CRC—16 bits (possibly masked with the I-RNTI or RA-preamble identifier)

In the design given above, a total of 68 bits may be sent for the random access response. A 68-bit message may be too large to efficiently send on the PDCCH. Improved efficiency may be achieved by splitting the information in the random access response into two parts and sending them on the PDCCH and PDSCH. In one design, the messages for the two parts may be as follows:

Message for part I sent on the PDCCH may include the following:
  Timing advance—8 bits
  DL resources—7 bits for resource block ID
  UL resources—7 bits for resource block ID
  Validity—2 bits
  CRC masked with the RA-preamble identifier—16 bits
Message for part II sent on the PDSCH may include the following:
  C-RNTI—16 bits
  CQI resources—16 bits
  PC resources—16 bits In the design given above, the DL and UL resources are conveyed by a resource block ID or index. A predetermined modulation scheme (e.g., QPSK) and/or a predetermined coding scheme (e.g., code rate ⅓) may be used for the UL resources. Alternatively, the modulation and coding for the UL resources may be sent on the PDCCH or PDSCH. Similarly, a predetermined modulation scheme (e.g., QPSK) and/or a predetermined coding scheme (e.g., code rate ⅓) may be used for the DL resources. Alternatively, the modulation and coding for the DL resources may be sent on the PDCCH. For both the UL and DL resources, the code rate may be dependent on the number of assigned resource blocks.

In the design given above, a 40-bit message may be sent on the PDCCH, which may be the standard message size for the PDCCH. In general, the message sent on the PDCCH for part I may be defined such that it can be sent like other messages on the PDCCH. The remaining information for the random access response may be sent on the PDSCH.

A specific design for various parameters that may be sent for the random access preamble and the random access response has been described above. In general, the random access preamble and the random access response may each include any set of parameters that may have any suitable sizes.

Figure 6:
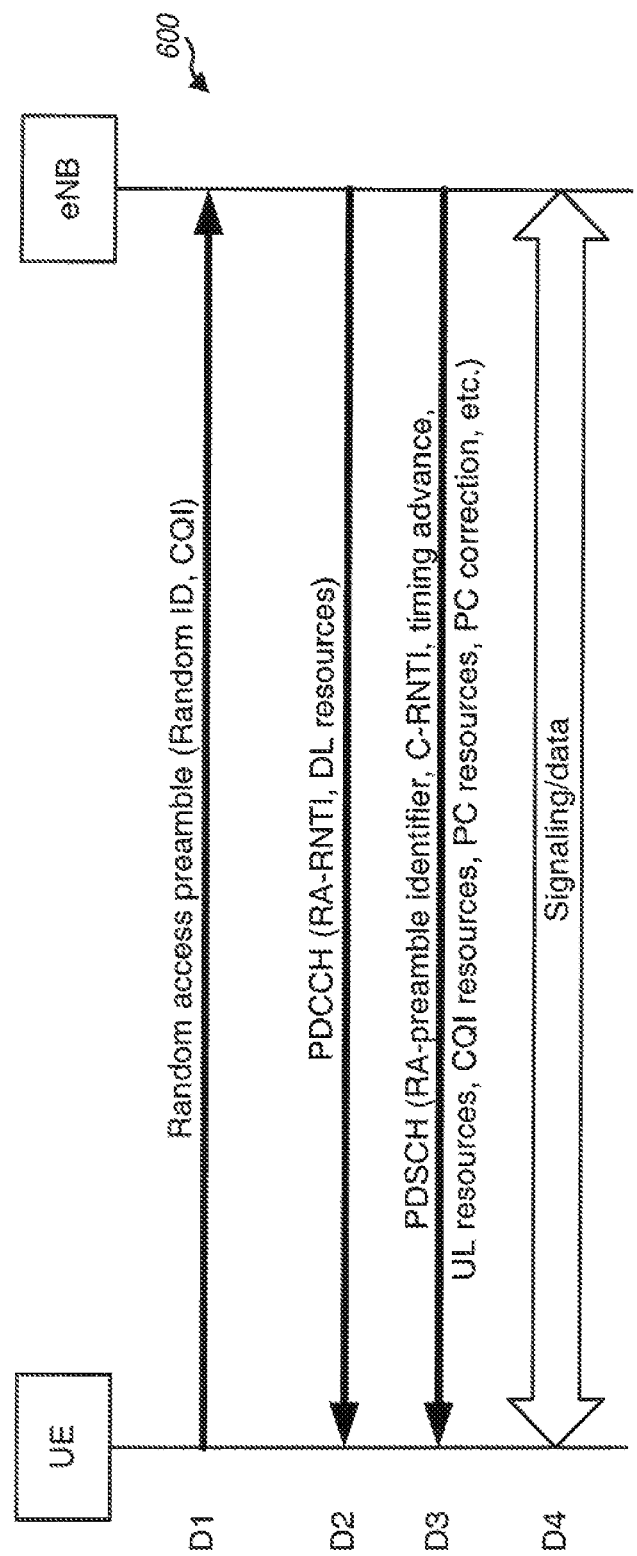

FIG. 6 shows a message flow for a design of a random access procedure 600. In this design, multiple RACHs may be available, and the UE may randomly select one of the available RACHs for use. Each RACH may be associated with a different Random Access RNTI (RA-RNTI). The available RACHs and/or their RA-RNTIs may be sent in the broadcast channel or conveyed in other manners. The UE may access the system by sending a random access preamble on the selected RACH (step D1). The random access preamble may include a random ID, a downlink CQI, an access type, some other information, or any combination thereof. The UE may be identified by a combination of the RA-preamble identifier and the RA-RNTI of the selected RACH during the system access. In effect, an I-RNTI may be defined based on the RA-preamble identifier and the RA-RNTI (instead of system time).

An eNB may receive the random access preamble from the UE and may respond by sending a random access response on the PDCCH and PDSCH to the UE (steps D2 and D3). In one design, the PDCCH may carry a message containing the RA-RNTI and the DL resources for the PDSCH. In one design, the PDSCH may carry a message containing the RA-preamble identifier, a C-RNTI (if available), timing advance, UL resources, CQI resources, PC resources, PC correction, etc. The messages sent on the PDCCH and PDSCH may also carry different and/or other information. The eNB may transmit the PDCCH and PDSCH as described above for FIG. 3.

The UE may receive and decode the message sent on the PDCCH. The UE may recognize that a message might be sent on the PDSCH to the UE based on the RA-RNTI included in the message sent on the PDCCH. The UE may then receive and decode the message sent on the PDSCH. The UE may recognize that this message might be addressed to the UE based on the RA-preamble identifier included in the message. After decoding these two messages, the UE has sufficient resources configured and can exchange Layer 3 signaling and/or data with the eNB (step D4).

Figure 7:
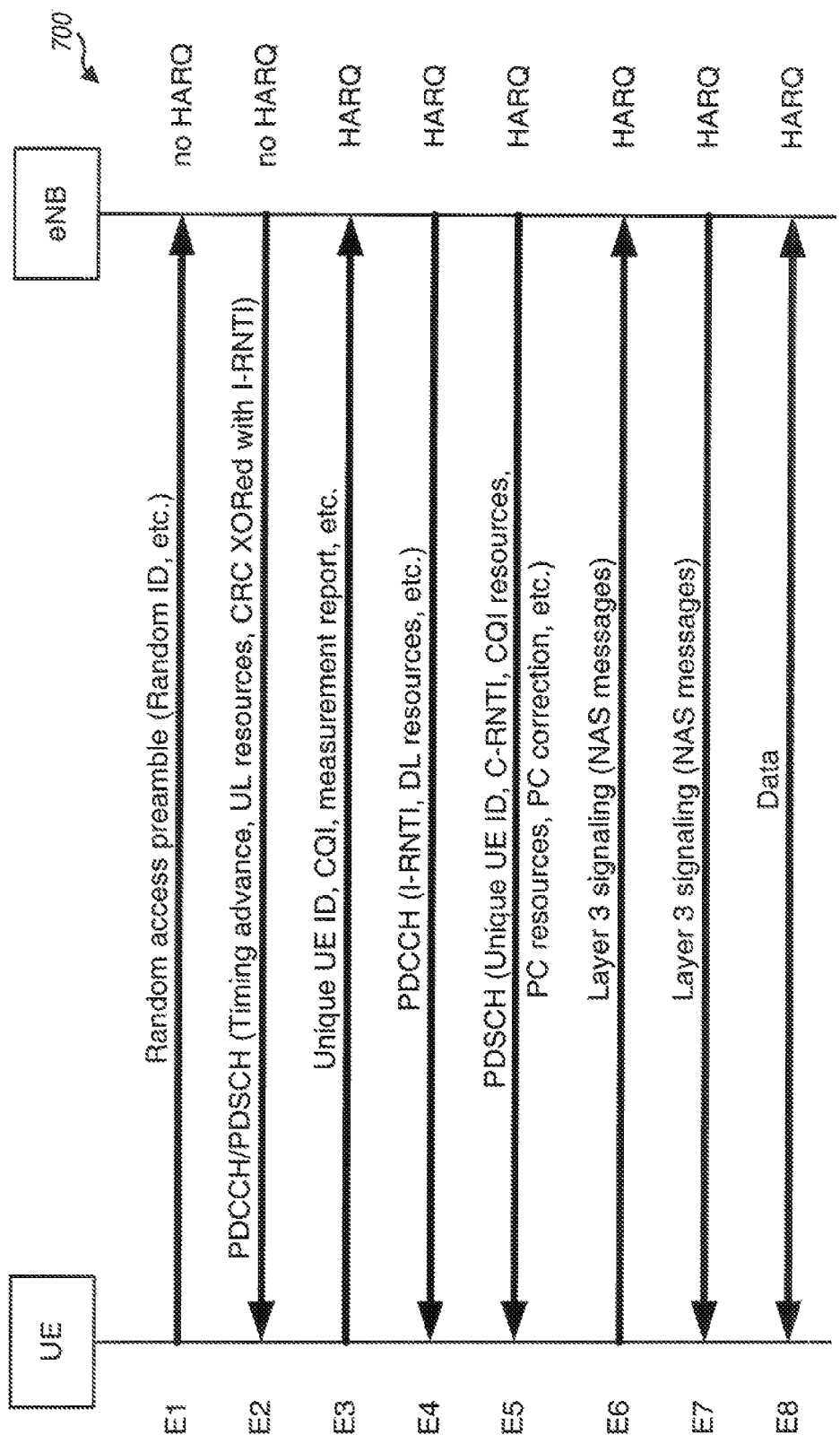

FIG. 7 shows a message flow for a design of a random access procedure 700. In this design, the UE may be in an RRC_NULL or RRC_IDLE state and may access the system by sending a random access preamble (step E1). The random access preamble may include a random ID and possibly one or more additional bits for downlink CQI and/or other information. The UE may determine an I-RNTI as described above for FIG. 3.

An eNB may receive the random access preamble from the UE and may respond by sending a random access response on the PDCCH and/or PDSCH to the UE (steps E2). The random access response may include timing advance, UL resources, and a CRC. The CRC may be XORed with the I-RNTI (as shown in FIG. 7), an RA-preamble identifier, an RA-RNTI, and/or other information to identify the UE being addressed. Different and/or other information may also be sent on the PDCCH/PDSCH in step E2.

The UE may then respond with a unique UE ID in order to resolve possible collision (steps E3). The unique UE ID may be an International Mobile Subscriber Identity (IMSI), a Temporary Mobile Subscriber Identity (TMSI), an International Mobile Equipment Identity (IMEI), an Electronic Serial Number (ESN), a Mobile Equipment Identifier (MEID), an IP address, etc. The unique UE ID may also be a registration area ID if the UE has already registered in a given area. The UE may also send downlink CQI, pilot measurement report, etc., along with the unique UE ID.

The eNB may receive a unique "handle" or pointer to the unique UE ID. The eNB may then assign a C-RNTI and control channel resources to the UE. The eNB may send a response on the PDCCH and PDSCH (steps E4 and E5). In one design, the PDCCH may carry a message containing the I-RNTI and the DL resources for the PDSCH. In one design, the PDSCH may carry a message containing the unique UE ID, the C-RNTI (if assigned), CQI resources, PC resources, PC correction, etc. The messages sent on the PDCCH and PDSCH may also carry different and/or other information.

The UE may receive and decode the messages sent on the PDCCH and PDSCH to the UE. After decoding these two messages, the UE has sufficient resources configured and can exchange Layer 3 signaling with the eNB (steps E6 and E7). The Layer 3 signaling may include Non-Access Stratum (NAS) messages for authentication of the UE, configuration of the radio link between the UE and eNB, connection management, etc. The UE and eNB may exchange data after completing the Layer 3 signaling (step E8).

The system may support hybrid automatic retransmission (HARQ) in order to improve reliability of data transmission. For HARQ, a transmitter may send a transmission for a message and may send one or more retransmissions, if needed, until the message is decoded correctly by a receiver, or the maximum number of retransmissions has been sent, or some other termination condition is encountered. A message may also be referred to as a packet, a data frame, a data unit, a data block, etc. Each transmission and each retransmission of a message may also be referred to as an HARQ transmission.

As shown in FIG. 7, HARQ may be used for the messages sent in steps E3 and later. A transmitter may send an HARQ transmission for a message, and a receiver may send an ACK if the message is decoded correctly or a NAK if the message is decoded in error. For an HARQ transmission sent on assigned DL resources, an ACK or NAK may be sent on UL control resources associated with the assigned DL resources. Similarly, for an HARQ transmission sent on assigned UL resources, an ACK or NAK may be sent on DL control resources associated with the assigned UL resources. The location of the ACKs/NAKs may thus be implicit and known a priori based on the assigned DL or UL resources.

Figure 8:
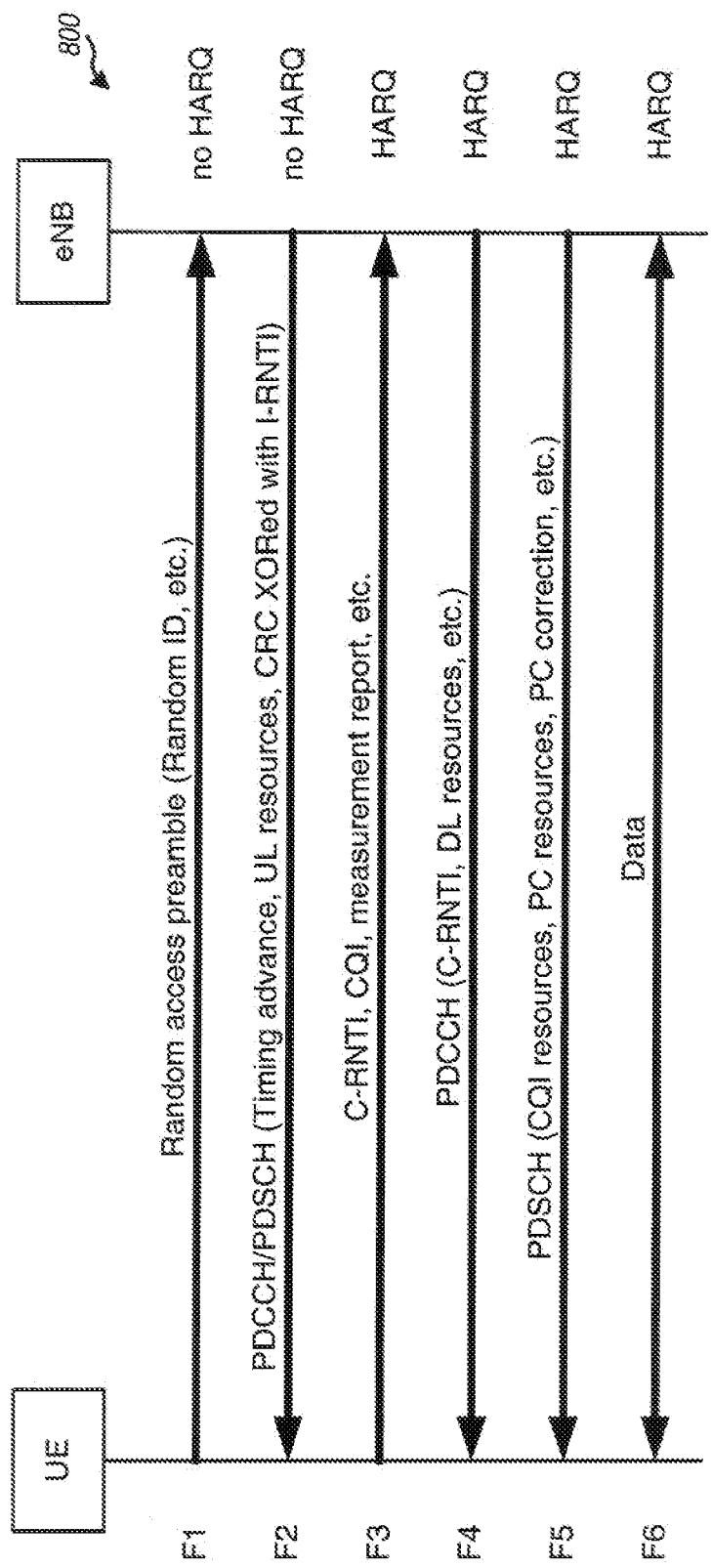

FIG. 8 shows a message flow for a design of a random access procedure 800. In this design, the UE may be in an RRC_IDLE or RRC_CONNECTED state and may already have an C-RNTI assigned to the UE. The UE may access the system from the RRC_IDLE state in response to receiving data to send or from the RRC_CONNECTED state in response to a handover command. The UE may send a random access preamble, which may include a random ID and possibly one or more additional bits for downlink CQI and/or other information (step F1).

An eNB may receive the random access preamble from the UE and may respond by sending a random access response on the PDCCH and/or PDSCH to the UE (steps F2). The random access response may include timing advance, UL resources, and a CRC that may be XORed with an I-RNTI (as shown in FIG. 8), an RA-preamble identifier, an RA-RNTI, and/or other information to identify the UE. Different and/or other information may also be sent on the PDCCH/PDSCH in step F2.

The UE may then send its C-RNTI, downlink CQI, pilot measurement report and/or other information to the eNB (steps F3). The eNB does not need to assign a C-RNTI but may assign control channel resources to the UE. The eNB may then send a response on the PDCCH and PDSCH (steps F4 and F5). In one design, the PDCCH may carry a message containing the C-RNTI and the DL resources for the PDSCH. In one design, the PDSCH may carry a message containing the CQI resources, PC resources, PC correction, etc. The messages sent on the PDCCH and PDSCH may also carry different and/or other information.

The UE may receive and decode the messages sent on the PDCCH and PDSCH to the UE. After decoding these two messages, the UE has sufficient resources configured and can exchange data with the eNB (step F6). Since the UE has already been authenticated prior to being assigned the C-RNTI, the Layer 3 signaling exchange may be omitted, and the UE and eNB may exchange data immediately.

FIG. 8 may also be used when the UE does not have an assigned C-RNTI. In this case, a registration area ID or some other identification information may be sent instead of the C-RNTI.

Figure 9:
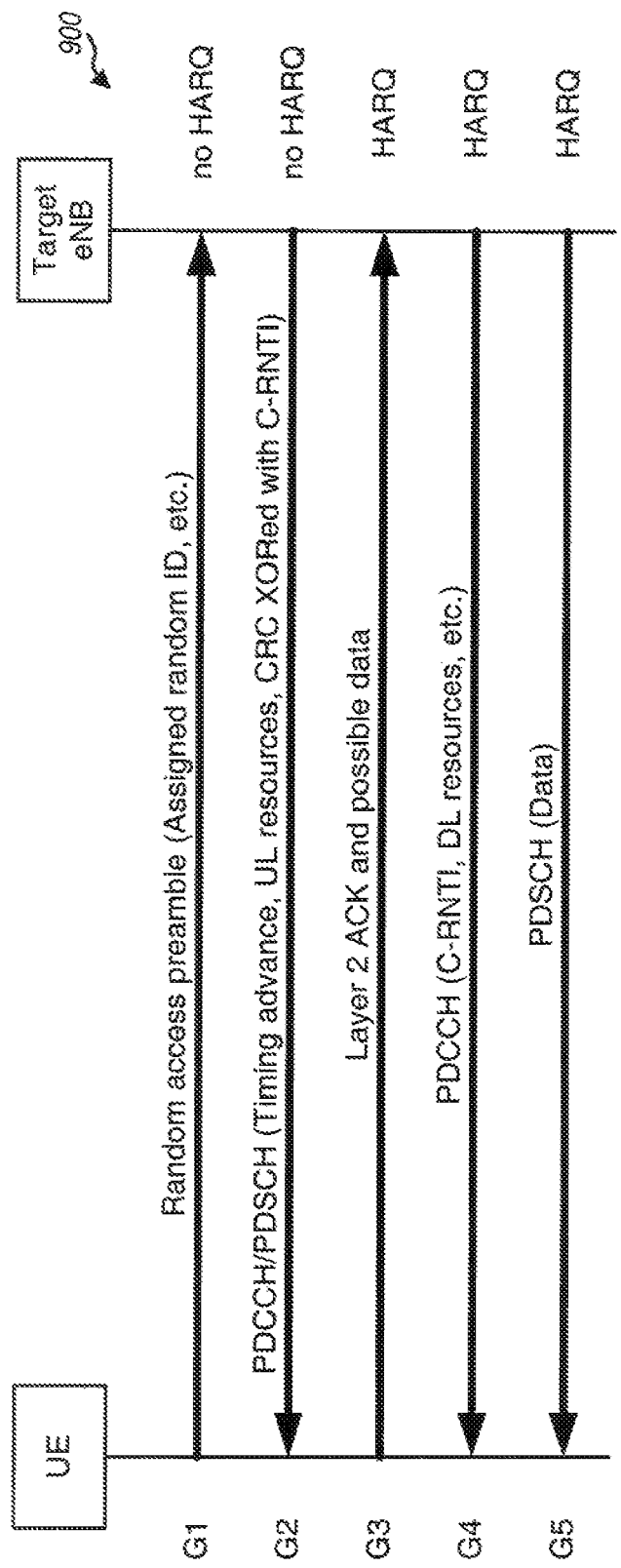

FIG. 9 shows a message flow for a design of a random access procedure 900 for handover. In this design, the UE may be communicating with a source eNB and may be handed over to a target eNB. The UE may be assigned a random ID by the source eNB for use to access the target eNB. To avoid collision, a subset of all possible random IDs may be reserved for handover, and the random ID assigned to the UE may be selected from this reserved subset. Information regarding the subset of reserved random IDs (or the remaining random IDs usable for normal system access) may be broadcast to all UEs or made known to the UEs in other manners.

The source eNB may inform the target eNB of the C-RNTI, random ID, CQI resources, PC resources and/or other information for the UE. Collision resolution may not be necessary due to a one-to-one mapping between the assigned random ID and the C-RNTI of the UE. The target eNB may thus have pertinent information for the UE prior to the random access procedure. For simplicity, FIG. 9 shows the random access procedure between the UE and the target eNode B.

The UE may send a random access preamble, which may include the random ID assigned to the UE and possibly other information (step G1). The target eNB may receive the random access preamble and may respond by sending a random access response on the PDCCH and/or PDSCH to the UE (steps G2). The random access response may include timing advance, UL resources, and a CRC that may be XORed with the C-RNTI of the UE. Different and/or other information may also be sent on the PDCCH/PDSCH in step G2.

After receiving the information sent in step G2, the UE has sufficient resources configured and can exchange data with the eNB. The UE may send a Layer 2 ACK for the information received in step G2 and may also send data and/or other information (steps G3). The eNB may then send data to the UE on the PDSCH (step G5) and may send signaling for the PDSCH on the PDCCH (step G4).

The random access procedure in FIG. 9 may also be used for initial system access. For example, the UE may operate in the RRC_IDLE state and may receive a page from the system, e.g., for an incoming call or for downlink data available for the UE. The page may include the assigned random ID, which may be selected from the reserved subset.

FIGS. 3 through 9 show various random access procedures that may be used for initial system access (e.g., from the RRC_NULL state), system access while idle (e.g., from the RRC_IDLE state), and system access for handover (e.g., from the RRC_CONNECTED state). For these random access procedures, the UE may transmit a random access preamble, and an eNB may respond with a random access response that may assign various types of resources and/or provide various types of information. In general, the eNB may assign any resources such as C-RNTI, UL resources, CQI resources, PC resources, etc., which may allow the UE to quickly transmit on the uplink. The eNB may also send control information such as timing advance, PC correction, etc., to control the uplink transmission from the UE.

Figure 10:
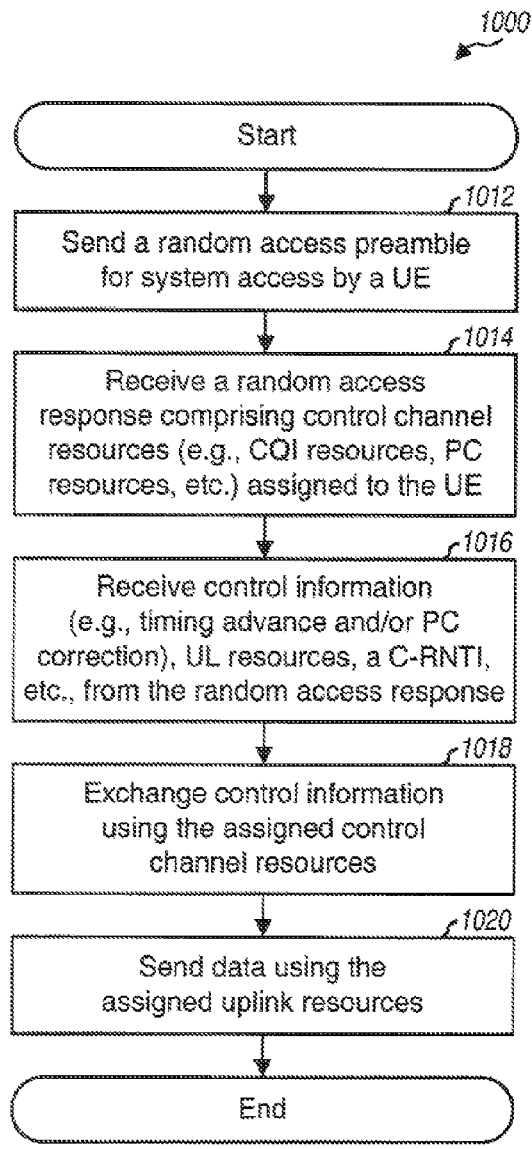

FIG. 10 shows a design of a process 1000 for system access by a UE. The UE may send a random access preamble for system access (block 1012). The random access preamble may include or may be determined based on a random ID, a downlink CQI, an access type, etc., or any combination thereof. An access sequence may be selected for the random access preamble from a pool of available access sequences. The selected access sequence may be sent to convey the random access preamble.

The UE may receive a random access response comprising control channel resources assigned to the UE (block 1014). The control channel resources may include CQI resources used to send CQI on the uplink by the UE, PC resources used to send PC corrections on the downlink to the UE, etc. The UE may also receive control information (e.g., timing advance and/or PC correction), UL resources, a C-RNTI, etc., from the random access response (block 1016). The UE may receive a first message for the random access response on a control channel (e.g., the PDCCH) for a shared data channel (e.g., the PDSCH) and may receive a second message for the random access response on the shared data channel. The first message may include identification information for the random access preamble, DL resources for the shared data channel, etc. The second message may include the assigned control channel resources, control information, UL resources, C-RNTI, etc. The random access response may also be sent in other manners. The UE may exchange control information using the assigned control channel resources (block 1018). The UE may also send data using the assigned uplink resources (block 1020).

Figure 11:
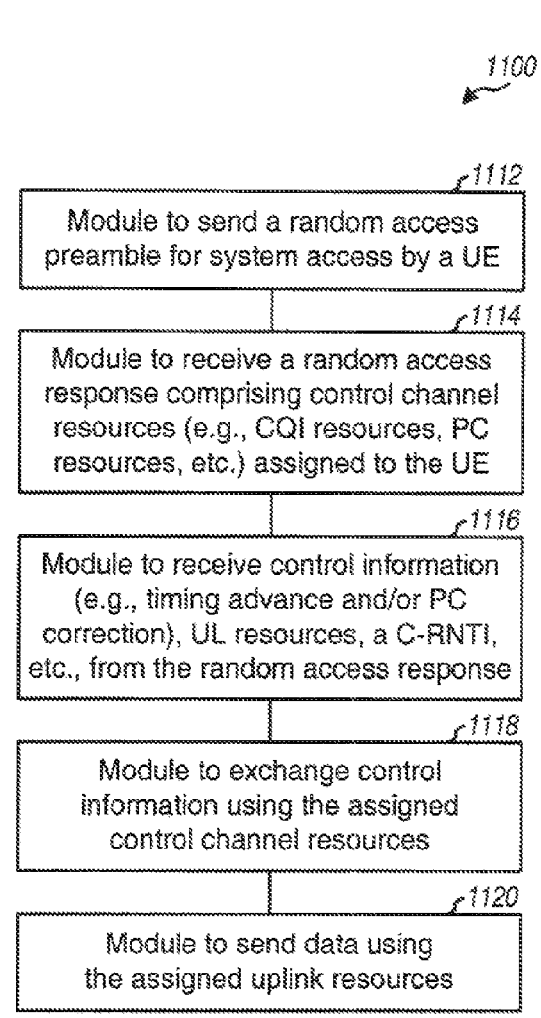

FIG. 11 shows a design of an apparatus 1100 for a UE. Apparatus 1100 includes means for sending a random access preamble for system access (module 1112), means for receiving a random access response comprising control channel resources assigned to the UE (module 1114), means for receiving control information, UL resources, a C-RNTI, etc., from the random access response (module 1116), means for exchanging control information using the assigned control channel resources (module 1118), and means for sending data using the assigned uplink resources (module 1120).

FIG. 12 shows a design of a process 1200 performed by a base station, e.g., an eNB, to support system access. The base station may receive a random access preamble sent by a UE for system access (block 1212). The base station may send a random access response comprising control channel resources (e.g., CQI resources, PC resources, etc.) assigned to the UE (block 1214). The base station may also send control information (e.g., timing advance and/or PC correction), UL resources, a C-RNTI, etc., in the random access response (block 1216). The base station may exchange control information with the UE using the assigned control channel resources (block 1218). The base station may also receive data from the UE via the assigned uplink resources (block 1220).

FIG. 13 shows a design of an apparatus 1300 for a base station. Apparatus 1300 includes means for receiving a random access preamble sent by a UE for system access (module 1312), means for sending a random access response comprising control channel resources assigned to the UE (module 1314), means for sending control information, UL resources, a C-RNTI, etc., in the random access response (module 1316), means for exchanging control information with the UE using the assigned control channel resources (module 1318), and means for receiving data from the UE via the assigned uplink resources (module 1320).

FIG. 14 shows a design of a process 1400 for system access by a UE. The UE may send a random access preamble for system access, with the random access preamble comprising identification information (block 1412). The UE may receive a random access response from a base station, with the random access response being asynchronous with respect to the random access preamble and addressing the random access preamble based on the identification information (block 1414). The identification information may comprise a random ID and/or some other information. The random access response may comprise a temporary ID (e.g., an I-RNTI), an RA-preamble identifier, a C-RNTI, and/or some other ID associated with or derived from the identification information. The UE may receive the random access response within a predetermined time window from when the random access preamble was sent.

The UE may select a random ID for use as the identification information. The UE may also be directly or indirectly assigned a random ID, which may be selected from a pool of reserved random IDs. For example, the UE may be assigned a random access preamble or access sequence determined based on the selected random ID and additional information such as CQI. The UE may determine the random access preamble based on the random ID and additional information, e.g., a downlink CQI, an access type, etc. The UE may receive a temporary ID (e.g., an I-RNTI) formed based on the random ID, an RA-preamble identifier determined based on the random ID, a C-RNTI assigned to the UE and associated with the random ID, and/or some other ID from the random access response.

For the design shown in FIG. 6, the UE may send the random access preamble on a random access channel selected from among a plurality of available random access channels. The UE may receive a first message for the random access response on a control channel for a shared data channel, with the first message including an RA-RNTI for the selected random access channel. The UE may receive a second message for the random access response on the shared data channel, with the second message including the random access preamble identifier.

FIG. 15 shows a design of an apparatus 1500 for a UE. Apparatus 1500 includes means for sending a random access preamble for system access, with the random access preamble comprising identification information (module 1512), and means for receiving a random access response from a base station, with the random access response being asynchronous with respect to the random access preamble and addressing the random access preamble based on the identification information (module 1514).

FIG. 16 shows a design of a process 1600 performed by a base station to support system access. The base station may receive a random access preamble sent by a UE for system access, with the random access preamble comprising identification information (block 1612). The base station may send a random access response to the UE, with the random access response being asynchronous with respect to the random access preamble and addressing the random access preamble based on the identification information (block 1614). The identification information may comprise a random ID and/or other information. The random access response may comprise a temporary ID (e.g., I-RNTI), an RA-preamble identifier, a C-RNTI, and/or some other ID associated with or derived from the identification information.

FIG. 17 shows a design of an apparatus 1700 for a base station. Apparatus 1700 includes means for receiving a random access preamble sent by a UE for system access, with the random access preamble comprising identification information (module 1712), and means for sending a random access response to the UE, with the random access response being asynchronous with respect to the random access preamble and addressing the random access preamble based on the identification information (module 1714).

FIG. 18 shows a design of a process 1800 for system access by a UE during handover. The UE may communicate with a first/source base station (block 1812). The UE may receive a random ID directly or indirectly for handover of the UE from the first base station to a second/target base station (block 1814). The UE may receive the random ID from the first base station, with the random ID being selected from a pool of reserved random IDs. The UE may also be assigned a random access preamble/access sequence composed of the random ID selected by the first base station and additional information such as CQI. The UE may send a random access preamble comprising the random ID to access the second base station, with the random ID being used to identify the UE (block 1816). The UE may receive a random access response comprising UL resources, timing advance, etc. (block 1818). The UE may determine that the random access response is intended for the UE based on a CRC masked with a C-RNTI assigned to the UE. The UE may exchange data with the second base station after receiving the random access response (block 1820).

FIG. 19 shows a design of an apparatus 1900 for a UE. Apparatus 1900 includes means for communicating with a first/source base station (module 1912), means for receiving a random ID for handover of the UE from the first base station to a second/target base station (module 1914), means for sending a random access preamble comprising the random ID to access the second base station, with the random ID being used to identify the UE (module 1916), means for receiving a random access response comprising UL resources, timing advance, etc. (module 1918), means for determining that the random access response is intended for the UE based on a CRC masked with a C-RNTI assigned to the UE, and means for exchanging data with the second base station after receiving the random access response (module 1920).

FIG. 20 shows a design of a process 2000 performed by a target base station to support system access during handover. The target base station may receive from a source base station a random ID assigned to a UE for handover from the source base station to the target base station (block 2012). The target base station may also receive other information for the UE such as a C-RNTI, CQI resources, PC resources, etc. from the source base station. The target base station may receive a random access preamble comprising the random ID from the UE (block 2014). The target base station may identify the random access preamble as being from the UE based on the random ID (block 2016). The target base station may send to the UE a random access response including UL resources, timing advance, a CRC masked with the C-RNTI, etc. (block 2018). The target base station may exchange data with the UE after sending the random access response (block 2020).

FIG. 21 shows a design of an apparatus 2100 for a target base station. Apparatus 2100 includes means for receiving from a source base station a random ID assigned to a UE for handover from the source base station to the target base station (module 2112), means for receiving a random access preamble comprising the random ID from the UE (module 2114), means for identifying the random access preamble as being from the UE based on the random ID (module 2116), means for sending to the UE a random access response including UL resources, timing advance, a CRC masked with the C-RNTI, etc. (module 2118), and means for exchanging data with the UE after sending the random access response (module 2120).

Figures 22, 23:
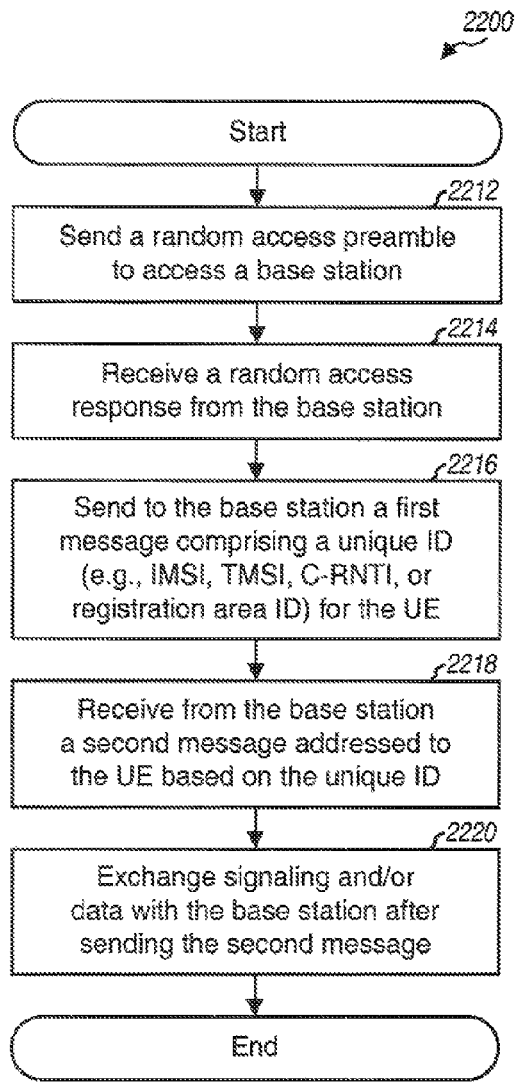

FIG. 22 shows a design of a process 2200 for system access by a UE. The UE may send a random access preamble to access a base station (block 2212). The UE may receive a random access response from the base station (block 2214). The random access response may include timing advance, UL resources, etc. The UE may send to the base station a first message comprising a unique ID for the UE (block 2216). The unique ID may be an IMSI, a TMSI, a C-RNTI, a registration area ID, or some other ID assigned to the UE. The UE may receive from the base station a second message addressed to the UE based on the unique ID (block 2218). The second message may include CQI resources, PC resources, etc. The UE may exchange signaling and/or data with the base station after sending the second message (block 2220).

The UE may operate in an idle state prior to sending the random access preamble and may send the random access preamble to transition from the idle state to an active state. The UE may exchange Layer 3 signaling with the base station after receiving the second message and may exchange data with the base station after completing the Layer 3 signaling exchange, as shown in FIG. 8.

The UE may send the random access preamble to perform handover to the base station. The UE may send its C-RNTI in the first message and may receive control channel resources from the second message. The UE may then exchange data with the base station after receiving the second message, as shown in FIG. 9.

The random access preamble and the random access response may be sent without HARQ. The first and second messages may be sent with HARQ, as shown in FIGS. 8 and 9.

FIG. 23 shows a design of an apparatus 2300 for a UE. Apparatus 2300 includes means for sending a random access preamble to access a base station (module 2312), means for receiving a random access response from the base station (module 2414), means for sending to the base station a first message comprising a unique ID for the UE (module 2316), means for receiving from the base station a second message addressed to the UE based on the unique ID (module 2328), and means for exchanging signaling and/or data with the base station after sending the second message (module 2320).

Figures 24, 25:
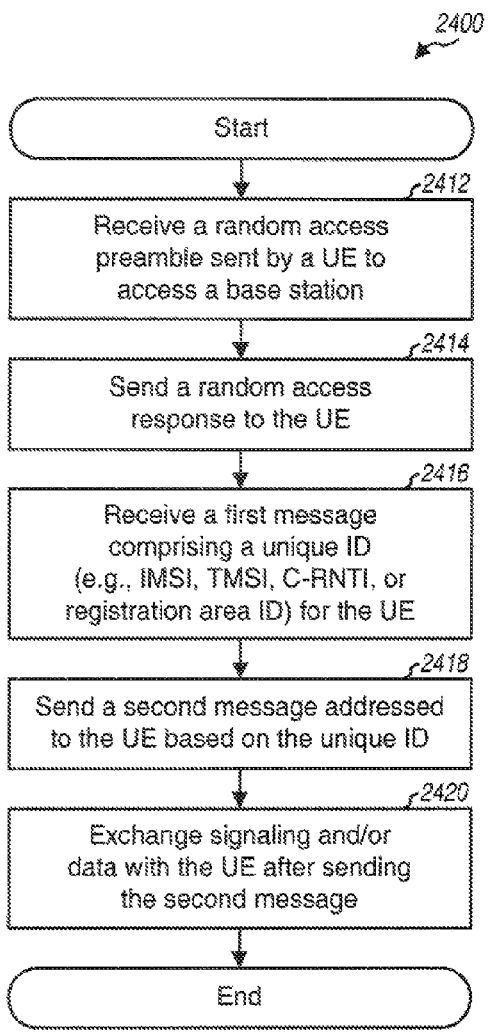

FIG. 24 shows a design of a process 2400 performed by a base station to support system access. The base station may receive a random access preamble sent by a UE to access the base station (block 2412). The base station may send a random access response to the UE (block 2414). The base station may receive a first message comprising a unique ID for the UE (block 2416). The base station may send a second message addressed to the UE based on the unique ID (block 2418). The base station may exchange signaling and/or data with the UE after sending the second message (block 2420).

FIG. 25 shows a design of an apparatus 2500 for a base station. Apparatus 2500 includes means for receiving a random access preamble sent by a UE to access the base station (module 2512), means for sending a random access response to the UE (module 2514), means for receiving a first message comprising a unique ID for the UE (module 2516), means for sending a second message addressed to the UE based on the unique ID (module 2518), and means for exchanging signaling and/or data with the UE after sending the second message (module 2520).

The modules in FIGS. 11, 13, 15, 17, 19, 21, 23 and 25 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. An apparatus for wireless communication, comprising:
at least one processor configured to communicate with a first base station by a user equipment (UE), to receive a random identifier (ID) from the first base station to use for handover of the UE from the first base station to a second base station, and to send a random access preamble comprising the random ID by the UE to access the second base station for the handover, the random ID being selected from a pool of random IDs reserved for handovers and used to identify the UE for the handover, wherein the UE is further assigned a random access preamble/access sequence composed of the random ID selected by the first base station and a channel quality indicator (CQI); and a memory coupled to the at least one processor.

2. The apparatus of claim 1, wherein the at least one processor is configured to receive a random access response comprising at least one of uplink resources assigned to the UE and timing advance to adjust transmit timing of the UE.

3. The apparatus of claim 1, wherein the at least one processor is configured to receive a random access response comprising a cyclic redundancy check (CRC) masked with a Cell Radio Network Temporary Identifier (C-RNTI) assigned to the UE.

4. The apparatus of claim 1, wherein the at least one processor is configured to exchange data with the second base station after receiving the random access response.

5. A method for wireless communication, comprising:
communicating with a first base station by a user equipment (UE);
receiving a random identifier (ID) from said first base station to use for handover of the UE from the first base station to a second base station; and
sending a random access preamble comprising the random ID by the UE to access the second base station for the handover, the random ID being selected from a pool of random IDs reserved for handovers and used to identify the UE for the handover,
wherein the UE is further assigned a random access preamble/access sequence composed of the random ID selected by the first base station and a channel quality indicator (CQI).

6. The method of claim 5, further comprising:
receiving a random access response comprising at least one of uplink resources assigned to the UE and timing advance to adjust transmit timing of the UE.

7. An apparatus for wireless communication, comprising:
at least one processor configured to receive from a first base station a random identifier (ID) assigned to a user equipment (UE) to use for handover from the first base station to a second base station, the random ID selected from a pool of random IDs reserved for handovers, to receive a random access preamble comprising the random ID sent by the UE to access the second base station for the handover, to identify the random access preamble as being from the UE for the handover based on the random ID, and to send a random access response to the UE; and
a memory coupled to the at least one processor.

8. The apparatus of claim 7, wherein the at least one processor is configured to send at least one of uplink resources and timing advance for the UE in the random access response.

9. The apparatus of claim 7, wherein the at least one processor is configured to receive a Cell Radio Network Temporary Identifier (C-RNTI) for the UE from the first base station, to generate a cyclic redundancy check (CRC) for the random access response, to mask the CRC with the C-RNTI, and to send the masked CRC in the random access response to the UE.

10. An apparatus for wireless communication, comprising:
at least one processor configured to receive a random identifier (ID) from a first base station to use for handover of a user equipment (UE) from the first base station to a second base station to send a random access preamble comprising the random ID from the UE to access the second base station, to receive a random access response from the second base station, to send to the second base station a first message comprising a unique ID determined by the UE and used to identify the UE, and to receive from the second base station a second message addressed to the UE based on the unique ID; and
a memory coupled to the at least one processor.

11. The apparatus of claim 10, wherein the at least one processor is configured to determine the unique ID for the UE based on at least one of an International Mobile Subscriber Identity (IMSI), a Temporary Mobile Subscriber Identity (TMSI), a Cell Radio Network Temporary Identifier (C-RNTI), and a registration area ID assigned to the UE.

12. The apparatus of claim 10, wherein the at least one processor is configured to receive at least one of timing advance and uplink resources in the random access response, and to receive at least one of channel quality indicator (CQI) resources and power control (PC) resources in the second message.

13. The apparatus of claim 10, wherein the at least one processor is configured to operate in an idle state prior to sending the random access preamble, and to send the random access preamble to transition from the idle state to an active state.

14. The apparatus of claim 13, wherein the at least one processor is configured to exchange Layer 3 signaling with the base station after receiving the second message, and to exchange data with the second base station after completing the Layer 3 signaling exchange.

15. The apparatus of claim 10, wherein the at least one processor is configured to send the random access preamble to perform handover to the second base station, to send the first message comprising a Cell Radio Network Temporary Identifier (C-RNTI) as the unique ID for the UE, to receive uplink resources assigned to the UE in the second message, and to send an uplink transmission to the second base station after receiving the second message.

16. The apparatus of claim 10, wherein the random access preamble and the random access response are sent without hybrid automatic retransmission (HARQ), and wherein the first and second messages are sent with HARQ.

17. A method for wireless communication, comprising:
sending a random access preamble that acts as a random ID from a user equipment (UE) to access a base station;
receiving from the base station a random access response addressed to the UE based at least in part on the random ID;
sending to the base station a first message comprising a unique ID for the UE and used to identify the UE; and
receiving from the base station a second message addressed to the UE based on the unique ID, the second message comprising an assigned identifier, the assigned identifier used to identify the UE for a communication session.

18. The method of claim 17, wherein the sending the unique ID comprises
determining the unique ID for the UE based on at least one of an International Mobile Subscriber Identity (IMSI), a Temporary Mobile Subscriber Identity (TMSI), a Cell Radio Network Temporary Identifier (C-RNTI), and a registration area ID assigned to the UE.

19. The method of claim 17, wherein the random access preamble is sent to perform handover to the base station, wherein the unique ID for the UE comprises a Cell Radio Network Temporary Identifier (C-RNTI) assigned to the UE, the method further comprising:
receiving uplink resources assigned to the UE in the second message; and
sending an uplink transmission to the base station after receiving the second message.

20. An apparatus for wireless communication, comprising:
at least one processor configured to receive a random access preamble sent by a user equipment (UE) to access a second base station, the random access preamble comprising a random identifier (ID) used for handover to the second base station, to send a random access response to the UE, to receive a first message comprising a unique identifier (ID) for the UE, the unique ID being determined by the UE and used to identify the UE, and to send a second message addressed to the UE based on the unique ID; and
a memory coupled to the at least one processor.

21. The apparatus of claim 20, wherein the at least one processor is configured to receive at least one of an International Mobile Subscriber Identity (IMSI), a Temporary Mobile Subscriber Identity (TMSI), a Cell Radio Network Temporary Identifier (C-RNTI), and a registration area ID assigned to the UE as the unique ID for the UE.

22. The apparatus of claim 20, wherein the at least one processor is configured to receive the random access preamble from the UE for handover to the second base station, to receive the first message comprising a Cell Radio Network Temporary Identifier (C-RNTI) as the unique ID for the UE, to send uplink resources assigned to the UE in the second message, and to receive an uplink transmission from the UE after sending the second message.

23. An apparatus for wireless communication, comprising:
at least one processor configured to send a random access preamble that acts as a random ID from a user equipment (UE) to access a base station, to receive from the base station a random access response addressed to the UE based at least in part on the random ID, to send to the base station a first message comprising a unique ID for the UE and used to identify the UE, and to receive from the base station a second message addressed to the UE based on the unique ID, the second message comprising an assigned identifier, the assigned identifier used to identify the UE for a communication session; and
a memory coupled to the at least one processor.

* * * * *